United States Patent
Parsa et al.

(10) Patent No.: US 9,876,714 B2
(45) Date of Patent: Jan. 23, 2018

(54) STATEFUL SERVICES ON STATELESS CLUSTERED EDGE

(71) Applicant: Nicira, Inc., Palo Alto, CA (US)

(72) Inventors: Mike Parsa, Santa Cruz, CA (US); Jayant Jain, Cupertino, CA (US); Xinhua Hong, Milpitas, CA (US); Anirban Sengupta, Saratoga, CA (US); Kai-Wei Fan, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 252 days.

(21) Appl. No.: 14/541,530

(22) Filed: Nov. 14, 2014

(65) Prior Publication Data
US 2016/0142297 A1     May 19, 2016

(51) Int. Cl.
| | |
|---|---|
| H04L 12/26 | (2006.01) |
| H04L 12/715 | (2013.01) |
| H04L 12/721 | (2013.01) |
| H04L 12/775 | (2013.01) |
| H04L 12/743 | (2013.01) |
| H04L 29/12 | (2006.01) |

(52) U.S. Cl.
CPC .......... H04L 45/46 (2013.01); H04L 45/38 (2013.01); H04L 45/58 (2013.01); H04L 45/7453 (2013.01); H04L 61/2503 (2013.01)

(58) Field of Classification Search
CPC .... H04L 43/0805; H04L 45/46; G06F 15/173
See application file for complete search history.

(56) References Cited

U.S. PATENT DOCUMENTS

| | | |
|---|---|---|
| 5,204,966 A | 4/1993 | Wittenberg et al. |
| 5,900,025 A | 5/1999 | Sollars |
| 6,108,308 A | 8/2000 | Flavin et al. |
| 6,687,245 B2 | 2/2004 | Fangman et al. |
| 7,120,693 B2 | 10/2006 | Chang et al. |
| 7,146,421 B2 | 12/2006 | Syvanne |
| 7,277,401 B2 | 10/2007 | Kyperountas et al. |

(Continued)

FOREIGN PATENT DOCUMENTS

| | | |
|---|---|---|
| EP | 1890438 | 2/2008 |
| WO | WO 2008/095010 | 8/2008 |

(Continued)

OTHER PUBLICATIONS

International Search Report and Written Opinion of PCT/US2014/072900, dated Nov. 27, 2015, Nicira, Inc.

(Continued)

*Primary Examiner* — Wei Zhao
(74) *Attorney, Agent, or Firm* — Adeli LLP

(57) ABSTRACT

In order to enable dynamic scaling of network services at the edge, novel systems and methods are provided to enable addition of add new nodes or removal of existing nodes while retaining the affinity of the flows through the stateful services. The methods provide a cluster of network nodes that can be dynamically resized to handle and process network traffic that utilizes stateful network services. The existing traffic flows through the edge continue to function during and after the changes to membership of the cluster. All nodes in the cluster operate in active-active mode, i.e., they are receiving and processing traffic flows, thereby maximizing the utilization of the available processing power.

20 Claims, 30 Drawing Sheets

(56) References Cited

U.S. PATENT DOCUMENTS

| | | | |
|---|---|---|---|
| 7,561,515 B2 | 7/2009 | Ross | |
| 7,724,670 B2 | 5/2010 | Nilakantan et al. | |
| 7,760,640 B2 | 7/2010 | Brown et al. | |
| 7,778,194 B1 | 8/2010 | Yung | |
| 7,818,452 B2 | 10/2010 | Matthews et al. | |
| 7,826,390 B2 | 11/2010 | Noel et al. | |
| 7,881,215 B1 | 2/2011 | Daigle et al. | |
| 7,948,986 B1 | 5/2011 | Ghosh et al. | |
| 8,005,770 B2 | 8/2011 | Minh et al. | |
| 8,190,767 B1 | 5/2012 | Maufer et al. | |
| 8,300,532 B1 | 10/2012 | Venkatramani et al. | |
| 8,316,113 B2 | 11/2012 | Linden et al. | |
| 8,339,994 B2 | 12/2012 | Gnanasekaran et al. | |
| 8,370,936 B2 | 2/2013 | Zuk et al. | |
| 8,553,552 B2 | 10/2013 | Hu et al. | |
| 8,625,426 B2 | 1/2014 | Strulo et al. | |
| 8,811,401 B2 | 8/2014 | Stroud et al. | |
| 8,897,132 B2 | 11/2014 | Feroz et al. | |
| 8,937,865 B1 | 1/2015 | Kumar et al. | |
| 8,942,238 B2 | 1/2015 | Kano | |
| 9,110,864 B2 | 8/2015 | Jamjoom et al. | |
| 9,137,052 B2 | 9/2015 | Koponen et al. | |
| 9,270,521 B2 | 2/2016 | Tompkins | |
| 9,282,027 B1 | 3/2016 | Brandwine et al. | |
| 9,317,469 B2 | 4/2016 | Gross et al. | |
| 9,349,135 B2 | 5/2016 | Sarshar | |
| 9,374,337 B2 | 6/2016 | Rangaraman et al. | |
| 9,450,862 B2 | 9/2016 | Chen et al. | |
| 9,497,281 B2 | 11/2016 | Jagadish et al. | |
| 2003/0093481 A1 | 5/2003 | Mitchell et al. | |
| 2003/0154399 A1 | 8/2003 | Zuk et al. | |
| 2004/0018839 A1 | 1/2004 | Andric et al. | |
| 2004/0197079 A1 | 10/2004 | Latvala et al. | |
| 2006/0176882 A1 | 8/2006 | Schein et al. | |
| 2007/0061492 A1 | 3/2007 | van Riel | |
| 2007/0201357 A1 | 8/2007 | Smethurst et al. | |
| 2008/0072305 A1 | 3/2008 | Casado et al. | |
| 2008/0098113 A1 | 4/2008 | Hansen et al. | |
| 2008/0259938 A1 | 10/2008 | Keene et al. | |
| 2009/0097406 A1* | 4/2009 | Nilakantan | H04L 45/04 370/235 |
| 2009/0129271 A1 | 5/2009 | Ramankutty et al. | |
| 2009/0193122 A1 | 7/2009 | Krishamurthy | |
| 2009/0199268 A1 | 8/2009 | Ahmavaara et al. | |
| 2009/0235325 A1 | 9/2009 | Dimitrakos et al. | |
| 2010/0046530 A1 | 2/2010 | Hautakorpi et al. | |
| 2010/0100616 A1 | 4/2010 | Bryson et al. | |
| 2010/0302940 A1 | 12/2010 | Patel et al. | |
| 2011/0013639 A1 | 1/2011 | Matthews et al. | |
| 2011/0026537 A1 | 2/2011 | Kolhi et al. | |
| 2012/0106560 A1 | 5/2012 | Gumaste | |
| 2012/0131216 A1 | 5/2012 | Jain et al. | |
| 2012/0250682 A1 | 10/2012 | Vincent et al. | |
| 2012/0258712 A1 | 10/2012 | Rozinov | |
| 2013/0007740 A1 | 1/2013 | Kikuchi et al. | |
| 2013/0073743 A1 | 3/2013 | Ramasamy et al. | |
| 2013/0155902 A1 | 6/2013 | Feng et al. | |
| 2013/0163594 A1 | 6/2013 | Sharma et al. | |
| 2013/0174177 A1 | 7/2013 | Newton et al. | |
| 2013/0201989 A1 | 8/2013 | Hu et al. | |
| 2013/0227550 A1 | 8/2013 | Weinstein et al. | |
| 2013/0239198 A1 | 9/2013 | Niemi | |
| 2013/0254085 A1 | 9/2013 | Tanimoto et al. | |
| 2013/0329584 A1 | 12/2013 | Ghose et al. | |
| 2013/0332983 A1 | 12/2013 | Koorevaar et al. | |
| 2013/0336337 A1 | 12/2013 | Gopinath et al. | |
| 2014/0068602 A1 | 3/2014 | Gember et al. | |
| 2014/0092906 A1 | 4/2014 | Kandaswamy et al. | |
| 2014/0115578 A1 | 4/2014 | Cooper et al. | |
| 2014/0195666 A1 | 7/2014 | Dumitriu et al. | |
| 2014/0269733 A1 | 9/2014 | Venkatesh | |
| 2014/0297964 A1* | 10/2014 | Nakase | G06F 12/1054 711/136 |
| 2014/0301388 A1* | 10/2014 | Jagadish | H04L 67/2814 370/389 |
| 2014/0304399 A1* | 10/2014 | Chaudhary | H04L 41/5009 709/224 |
| 2014/0310418 A1 | 10/2014 | Sorenson, III et al. | |
| 2014/0380087 A1 | 12/2014 | Jamjoom et al. | |
| 2015/0146539 A1 | 5/2015 | Mehta et al. | |
| 2015/0263899 A1 | 9/2015 | Tubaltsev et al. | |
| 2015/0312155 A1 | 10/2015 | Anand et al. | |
| 2016/0028630 A1 | 1/2016 | Wells | |
| 2016/0028855 A1 | 1/2016 | Goyal et al. | |
| 2016/0043901 A1 | 2/2016 | Sankar et al. | |
| 2016/0119236 A1 | 4/2016 | DeCusatis et al. | |
| 2016/0142295 A1 | 5/2016 | Parsa et al. | |
| 2016/0142296 A1 | 5/2016 | Parsa et al. | |
| 2016/0142314 A1 | 5/2016 | Parsa et al. | |

FOREIGN PATENT DOCUMENTS

| | | |
|---|---|---|
| WO | PCT/US2014/072900 | 12/2014 |
| WO | WO 2016/076900 | 5/2016 |

OTHER PUBLICATIONS

Invitation to Pay Additional Fees of PCT/US2014/072900, dated Sep. 21, 2015, Nicira, Inc.

Author Unknown, "Enabling Service Chaining on Cisco Nexus 1000V Series," Month Unknown, 2012, 25 pages, Cisco.

Aversa, Luis, et al., "Load Balancing a Cluster of Web Servers Using Distributed Packet Rewriting," Computer Science Department Technical Report, Jan. 6, 1999, pp. 1-13, Boston University, Boston, MA, USA.

Dixon, Colin, et al., "An End to the Middle," Proceedings of the 12th conference on Hot topics in operating systems USENIX Association, May 2009, pp. 1-5, Berkeley, CA, USA.

Guichard, J., et al., "Network Service Chaining Problem Statement," Network Working Group, Jun. 13, 2013, 14 pages, Cisco Systems, Inc.

Joseph, Dilip, et al., "A Policy-aware Switching Layer for Date Centers," Jun. 24, 2008, 26 pages, Electrical Engineering and Computer Sciences, University of California, Berkeley, CA, USA.

Koponen, Teemu, et al., "Network Virtualization in Multi-tenant Datacenters," Aug. 2013, pp. 1-22, VMware, Inc., Palo Alto, California, USA.

Schroeder, Trevor, et al., "Scalable Web Server Clustering Technologies," IEEE Network, vol. 14, No. 3, May 1, 2000, pp. 38-45, IEEE Service Center, New York, NY, USA.

Sekar, Vyas, et al., "Design and Implementation of a Consolidated Middlebox Architecture," 9th USENIX conference on Networked System Design and Implementation, Apr. 25-27, 2012, 14 pages.

Sherry, Justine, et al., "Making Middleboxes Someone Else's Problem: Network Processing as a Cloud Service," SSIGCOMM, Aug. 13-17, 2012, 12 pages, ACM, Helsinki, Finland.

* cited by examiner

Related flows hashed to different nodes

Use indirection to force related flows on the same node

STATEFUL SERVICES ON STATELESS CLUSTERED EDGE

BACKGROUND

Stateful network services such as firewall and NAT are common at the network edge where the traffic flows in and out. It provides essential security capabilities such as network security gateway services and Web load balancing for performance and availability. As network traffic increases, demand for the edge services also increases, requiring allocation of additional resources for edge services.

SUMMARY

In order to enable dynamic scaling of network services at the edge, some embodiments provide systems and methods to be able to add new nodes or remove existing nodes while retaining the affinity of the flows through the stateful services. Some embodiments provide a cluster of network nodes that can be dynamically resized to handle and process network traffic that utilizes stateful network services. The existing traffic flows through the edge continue to function during and after the changes to membership of the cluster. In some embodiments, all nodes in the cluster operate in active-active mode, i.e., they are receiving and processing traffic flows, thereby maximizing the utilization of the available processing power.

In order to create a dynamically scalable cluster of nodes that perform stateful services at the edge of a network (or a segment of a network), some embodiments distribute flows to different nodes of the cluster such that all nodes of the cluster are actively participating in stateful services. In some embodiments, flows are hashed into the nodes of the cluster by a consistent hash function. The consistent hash function is over the nodes of the cluster (or based on the membership of the cluster) such that the different flows will be distributed nearly evenly to different nodes of the cluster. In some of these embodiments, every possible hash value produced by the consistent hash function is mapped to a node in the cluster, and every node is mapped to at least one possible hash value. Consequently, every node of the cluster is actively handling the stateful services of at least one flow. To ensure that the stateful services are correctly performed for each flow, each flow is assigned to a node in the cluster during the lifetime of the flow. The node assigned to the flow manages and maintains the state information related to the flow. In some embodiments, identifiers of the flow are used to direct packets belonging to that flow to the assigned node.

Upon receiving a packet from an ECMP process, a node in some embodiments identifies the owner node of the flow and forwards the packet to the identified owner node. In some embodiments, each node in an edge cluster performs consistent hash on the flow identifiers in the packet (e.g., the five-tuple of source (IP) address, source port, destination (IP) address, destination port, transport protocol) in order to identify the flow's owner node.

In some embodiments, the owner node identified by consistent hash of a particular flow is not the most suitable edge node to perform the stateful service on the flow. This is the case when the owner node of the flow identified by consistent hash does not have the requisite state information needed to properly process the flow, but rather such state information is kept at another node in the cluster. This other node can be a former owner node of the flow, or an owner node of a related flow whose state information is needed to properly process the flow. In order to provide consistent stateful service, the owner node identified by consistent hash in some embodiments delegates the packets to the node where the state information is kept.

Some embodiments allow heterogeneous services support in a cluster. In some of these embodiments, the consistent hash function is based on the type of service that is invoked to serve the flow. Specifically, in some embodiments, different sets of nodes are used for different services, i.e., different services have different consistent hash functions based on different sets of nodes.

In some embodiments, flow delegation is based on pinned flow tables and indirection tables that reside in nodes of the edge cluster. Each entry in an indirection table and a pinned flow table corresponds to a flow. Each indirection table entry instructs its edge node to forward or delegate packets belonging to the flow according to the entry. Each entry in a pinned flow table for a flow instructs its edge node to process the flow locally (hence pinning or anchoring the flow) and to provide stateful service for the flow, regardless of whether the node is the owner node of the flow. Instead of the owner node forwarding packets to a delegate node at which the flow's state information is kept, some embodiments forward the state information to the owner node.

In some embodiments, the identification of owner node is not only based on the hashing function used, but also on the membership of edge nodes in the cluster. In other words, the determination of which edge node is the owner node of a given flow is partially based on how many edge nodes are in the edge cluster that are capable of providing stateful services. Any change in the membership in the edge cluster would thus alter the result of consistent hash. The size of the edge cluster can be changed to either add new nodes or removing existing nodes. Some embodiments allow this resizing of the edge cluster dynamically, i.e., while the edge cluster is actively handling and processing network traffic that utilizes stateful network services. The existing traffic flows through the edge continue to be processed during and after the changes to membership of the cluster. In order to provide the stateful services without interruption through the resizing of the edge cluster, some embodiments anchor stateful services for existing flows at their original owner nodes until those existing flows are complete. In some embodiments, the nodes in the edge cluster forward packets belonging to existing flows to their original owner nodes, which still maintain the state information of the existing flows necessary for the stateful services.

In some embodiments, the removal of edge nodes is done gracefully without interrupting stateful services provided by edge cluster. For some of these embodiments, the stateful processing of existing flows are kept on their original owner nodes during the node removal process.

In some embodiments, delegation of flow is also necessary when state information of a first flow residing on a first node is the requisite state information of a second flow assigned to a second node. In some embodiments, the first flow and the second flow are related flows that are assigned to different owner nodes by consistent hash. In some embodiments, this occurs when a control flow and a data flow of a same process are assigned to different owner nodes because they have different flow identifiers. In order to ensure that the related flows are operating off a same set of state information being maintained on a same node, some embodiments use flow delegation to force related flows to be statefully processed by the same node, even if the two related flows are hashed to different owner nodes by consistent hash.

In some embodiments, the owner node of a flow according to the original address pushes an indirection message to the owner node of the flow according to the translated DNAT addresses in order to keep packets of the flow on the same node. As a result, the owner node identified by translated DNAT address has an indirection table entry for delegating packets of the flow to the owner node identified by the original address, which has a pinned flow table entry to accept and process packets with flow identifiers based on the DNAT address. In some other embodiments, instead of flow delegation, an edge cluster performing DNAT determines owner nodes without using the destination addresses, which may be translated. In other words, the cluster applies consistent hash only to fields that are unaffected by DNAT (e.g., source address fields, source port fields, protocol fields).

In case of SNAT, edge nodes in the cluster changes the source address of outgoing southbound packets. The SNAT of a packet occurs after routing by the owner node of its flow. In some embodiments, each node in the edge cluster uses its own unique SNAT address when performing address translation. The return northbound traffic is forwarded to the same owner node based on those unique SNAT addresses in the source address field. The owner node then applies the inverse NAT while maintaining state of the stateful SNAT process.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

In order to enable dynamic scaling of network services at the edge, some embodiments provide systems and methods to be able to add new nodes or remove existing nodes while retaining the affinity of the flows through the stateful services. Some embodiments provide a cluster of network nodes that can be dynamically resized to handle and process network traffic that utilizes stateful network services. The existing traffic flows through the edge continue to function during and after the changes to membership of the cluster. In some embodiments, all nodes in the cluster operate in active-active mode, i.e., they are receiving and processing traffic flows, thereby maximizing the utilization of the available processing power.

In order to create a dynamically scalable cluster of nodes that perform stateful services at the edge of a network (or a segment of a network), some embodiments distribute flows to different nodes of the cluster such that all nodes of the cluster are actively participating in stateful services. In some embodiments, flows are hashed into the nodes of the cluster by a consistent hash function. The consistent hash function is over the nodes of the cluster (or based on the membership of the cluster) such that the different flows will be distributed nearly evenly to different nodes of the cluster. In some of these embodiments, every possible hash value produced by the consistent hash function is mapped to a node in the cluster, and every node is mapped to at least one possible hash value. Consequently, every node of the cluster is actively handling the stateful services of at least one flow.

Figure 1:
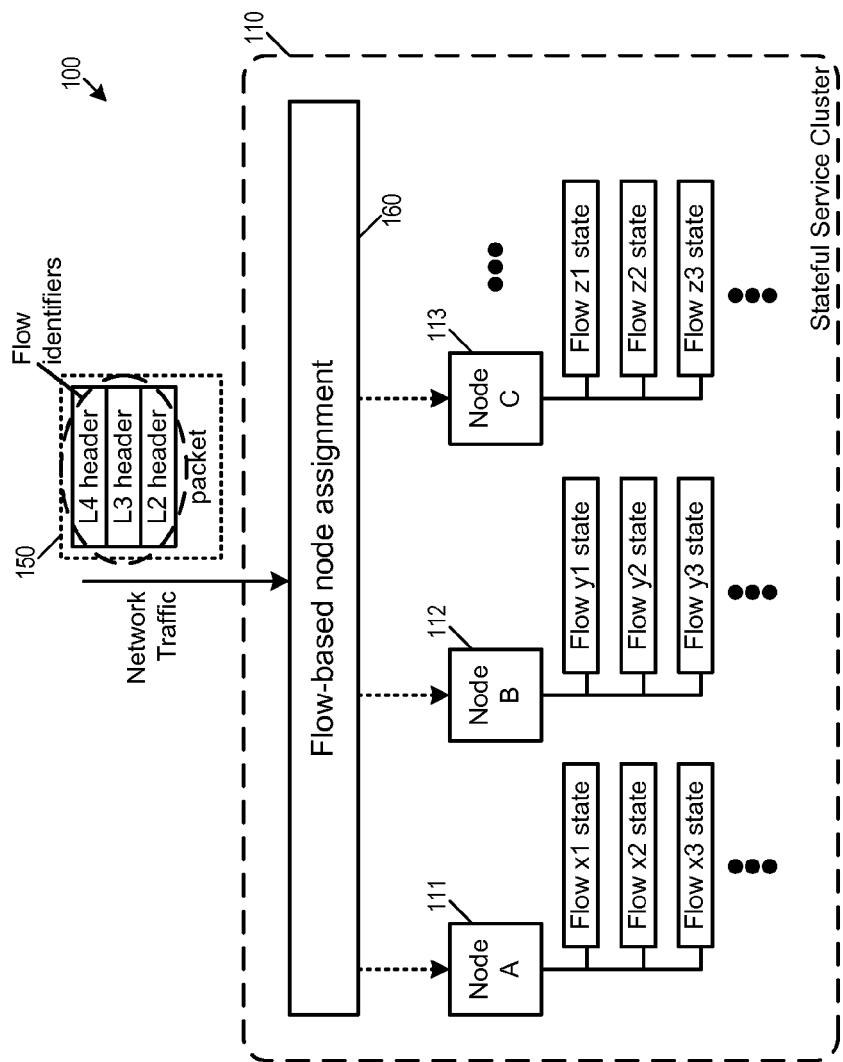
FIG. 1 conceptually illustrates a cluster of nodes in a network in which network traffic is distributed to nodes in a cluster for performing stateful services.

To ensure that the stateful services are correctly performed for each flow, each flow is assigned to a node in the cluster during the lifetime of the flow. The node assigned to the flow manages and maintains the state information related to the flow. In some embodiments, identifiers of the flow are used to direct packets belonging to that flow to the assigned node. For some embodiments, FIG. 1 conceptually illustrates a cluster of nodes 110 in a network 100 in which network traffic is distributed to nodes in a cluster for performing stateful services. The traffic distribution in the cluster upholds the affinity or correspondence between flows and their assigned nodes by using flow identifiers.

As illustrated, the network 100 includes the service cluster 110, which includes processing nodes 111-113 that are capable of providing services to the network. In some embodiments, the services provided by the cluster 110 includes network address translation (NAT) and firewall. These services in some embodiments are implemented at the edge of the network for processing and/or filtering traffic in and out of the network. Consequently, these services are sometimes referred to as edge services, and the nodes in the cluster 110 performing these edge services are referred to as edge nodes. In some embodiments, the services provided by the nodes in the cluster 110 are stateful services with regard to flows. In other words, a node tasked to provide the stateful service of a flow is required to maintain and manage the state of the flow.

A flow in some embodiments refers to a collection of packets belonging to a transport layer (i.e., layer 4 or L4) connection or session. A node processing a flow in some embodiments include a stateful engine to keep track of the protocol exchanges that have taken place over the transport layer connection in order to provide the stateful service (e.g., making the firewall assessment according to a set of rules). In some embodiments, the transport layer connection is based on Transmission Control Protocol (TCP), and hence the L4 or transport layer connection is referred to as a TCP connection.

As illustrated, the cluster 110 is receiving network traffic that includes the packet 150, which includes headers for L2, L3, and L4 layer. In some embodiments, the L2 header of the packet includes source and destination MAC (medium access control) addresses, the L3 header includes source and destination IP addresses, and the L4 header includes source port, destination port, as well as transport protocol identifiers. In some embodiments, the source IP address, destination IP addresses, the source port, the destination port, and the protocol collectively forms a tuple of identifiers that is used to uniquely identify a flow (e.g., five-tuple transport connection identifier.)

As mentioned, in some embodiments, each flow is assigned to a node so the state information of the flow is maintained and managed by that node. In some embodiments, a node that is assigned to handle a particular flow is referred to as the owner node of the flow. To ensure that packets belonging to a flow be processed by a same node in the cluster (i.e., the flow's owner node), some embodiments use flow identifiers in a packet to decide which node in the service cluster should be used to process the packet. As illustrated, the flows "x1", "x2", and "x3" are assigned to the 111 (Node A) based on the flow identifiers for flows x1, x2, and x3 respectively. The flows "y1", "y2", and "y3" are assigned to the 112 (Node B) based on the flow identifiers for flows y1, y2, and y3 respectively. The flows "z1", "z2", and "z3" are assigned to the 113 (Node C) based on the flow identifiers for flows z1, z2, and z3 respectively. This assignment operation is conceptually illustrated by a flow-based node assignment module 160 in the cluster 110. In some embodiments, this assignment operation is performed by computing devices implementing the cluster of nodes or by the individual nodes 111-113 themselves.

A node is a computing device or a piece of software running on a computing device that performs operations based data in network packets. Some network nodes receive and/or forward data packets. Some network nodes perform computation or other applications based on data in data packets (e.g., compute nodes). In some embodiments, a node is implemented by a stand-alone physical router. In some embodiments, a node is virtual machine implemented on a computing device that runs a hypervisor to serve as its host machine. In some embodiments, one computing device hosts several virtual machines that are nodes in the network. Nodes 111-113 are edge service nodes that provide service operations (e.g., NAT or firewall) on packets between the network 100 and the external world (e.g., the Internet or other sections of the network).

Each of the node 111-113 is also capable of providing the required stateful service for packets belonging to flows that are assigned to the node. For a stateful service, a node will in some embodiments creates a state for each flow that it processes. As such, the state of each flow is consistently maintained by one node (i.e., the flow's owner node). As illustrated, the node 111 (Node A) is the owner node flows x1, x2, and x3 and maintains their state information for stateful processing. Likewise, the node 112 (Node B) is the owner node of and maintains the states of flows y1, y2, and y3, and the node 113 (Node C) is the owner node of and maintains the states of flows z1, z2, and z3. In some embodiments, the nodes of the same cluster (e.g., nodes 111-113 of the cluster 110) belong to a same L2 segment and can forward packets to each other by L2 level protocols.

The edge cluster 110 is defined by a container that includes a group of nodes in some embodiments. A node container (and hence the corresponding edge cluster) is defined in some embodiments using VM templates by a network manager in some embodiments. The network manager sends and receives events to the nodes in a container. The network manager also manages the lifecycle of the nodes in the container. In some embodiments, a "north" container is defined for the cluster's "north" facing interfaces (with compute nodes) in order to facilitate the configuration of resources (e.g., the address of edge nodes) for southbound traffic. Likewise, a "south" container is defined for the cluster's "south" facing interfaces (with external world or Internet) in order to facilitate the configuration of resources for northbound traffic.

Several more detailed embodiments of the invention are described below. Section I further describes systems in which flow-based stateful network services are distributed among edge service nodes in a cluster. Section II describes methods for dynamically resizing a cluster of edge service nodes. Section III describes the handling of related flows by a cluster of edge service nodes. Section IV describes the handling of address translation when distributing stateful services to a cluster of edge nodes. Section V describes edge service nodes that are implemented as virtual machines that are hosted by computing devices. Section VI describes an example computing device that serve as a host machine of an edge node VM. Finally, section IV describes an electronic system with which some embodiments of the invention are implemented.

I. Distributing Stateful Service to Edge Nodes a. ECMP

As mentioned, the cluster 110 is an edge cluster providing edge services between the network 100 and the external world. In some embodiments, incoming traffic from the outside is distributed to any number of edge nodes using ECMP (Equal Cost Multi-path Routing). Edge nodes participate in ECMP with an adjacent router through advertisement of BGP (Border Gateway Protocol) or OSPF (Open Shortest Path First) routes in some embodiments. The outgoing traffic into the external world can likewise be distributed to any edge node participating in ECMP process.

Figure 2B:
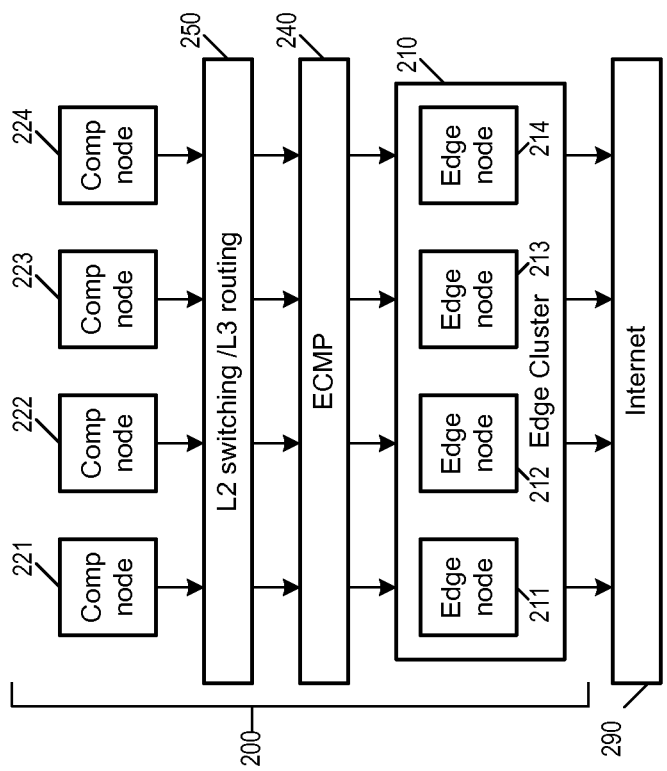
FIGS. 2a-b illustrates an edge cluster that includes multiple edge nodes for processing and/or filtering traffic in and out of a network.
Figure 2A:
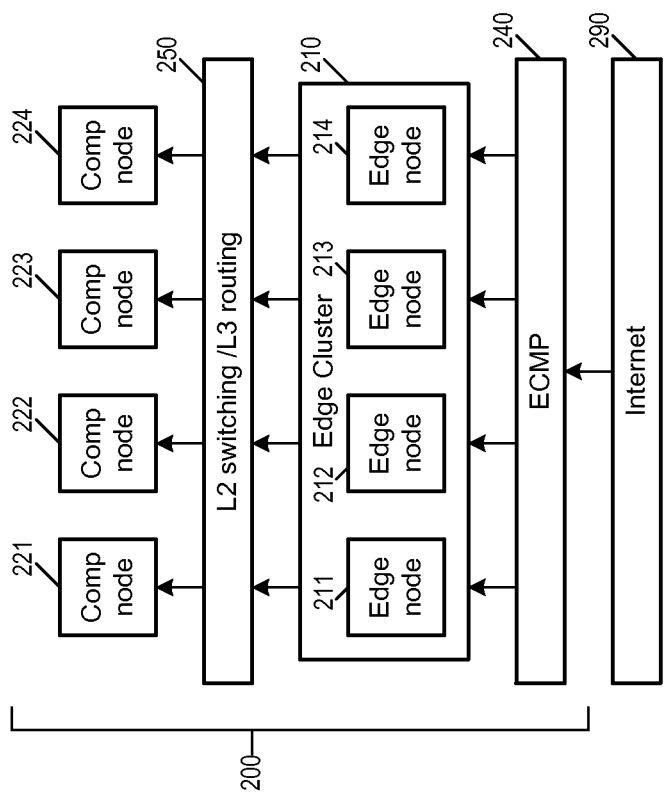

FIGS. 2a-b illustrates an edge cluster 210 that includes multiple edge nodes 211-214 for processing and/or filtering traffic in and out of a network (or network segment) 200. The network (or network segment) 200 is a collection of interconnected computing and communication resources whose communication traffic with the external world 290 (e.g., Internet or other network segments) is controlled, monitor, or filtered by the edge cluster 210, which is logically situated at the "edge" of the network 200 interfacing the external world.

Some embodiments refer to network traffic entering the network from the external world as northbound traffic and traffic leaving the network into the external worlds as southbound traffic. As illustrated, the network includes a number of compute nodes 211-214 that receives network traffic from the external world 290 through the edge cluster 210 and hence serves as the terminus of the northbound traffic. The compute nodes also generates traffic (or forwards traffic) destined for the external world 290 through the edge cluster 210 and hence are the origins of the southbound traffic.

FIG. 2a illustrates northbound traffic that comes into the network 200 from the external world 290 (e.g., Internet or other network segments) through the edge cluster 210 into the compute nodes 221-224. As illustrated, the northbound traffic is distributed by an ECMP router 240 to the edge nodes 211-214 in the edge cluster 210 for stateful processing. The processed northbound traffic is then forwarded to the compute nodes 221-224 through L2-switching or L3-routing. FIG. 2b illustrates southbound traffic that comes from the compute nodes 221-224 through the edge cluster 210 to the external world 290. The southbound traffic is distributed by the ECMP router 240 (or another ECMP router in the network 200) to the edge nodes 211-214 in the edge cluster 210 for stateful processing. The processed southbound traffic is then forwarded onto the external world 290 (e.g., the Internet or other network segments).

b. Owner Node

In some embodiments, traffic in both direction of the flow is assigned to be handled by the same node in order to ensure that the stateful network services function correctly. Some embodiments assign packets to edge nodes based on flow identifiers. In some embodiments, ECMP are operations that are independent of flow identification. There is no guarantee that ECMP would consistently distribute packets of a same flow to the same edge node for stateful processing. Some embodiments therefore apply a stateless consistent hash function to the flow identifiers of each packet in order to identify the owner node of its flow. For each given flow, the consistent hash produces a consistent hash value for all packets of the flow. This ensures that packets belonging to a same flow would always be statefully processed by the same node (i.e., the flow's owner node), even when ECMP is used to distribute packets.

Figure 3:
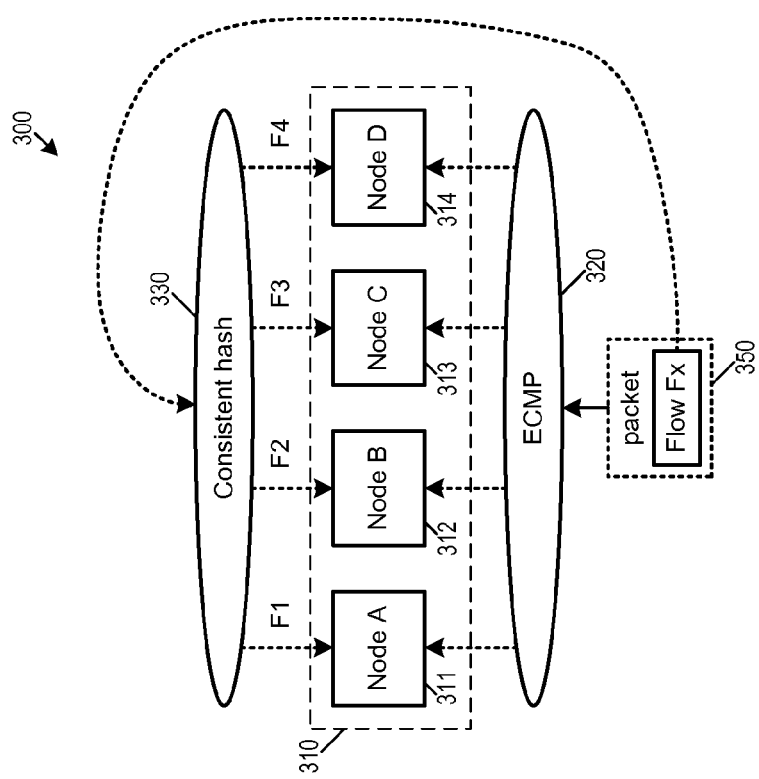
FIG. 3 conceptually illustrates the distribution of stateful service to a cluster of nodes based on consistent hash of flows in a network.

FIG. 3 conceptually illustrates the distribution of stateful service to a cluster 310 of nodes based on consistent hash of flows in a network 300. The cluster 300 includes nodes 311-314. As illustrated, the packets 350 in the network 300 are distributed to nodes 311 based on an ECMP process 320. However, the flows that these packets 350 belong to are assigned to the four nodes 311-314 according to a consistent hash function 330. As illustrated, the flow F1 is hashed to the node 311, the flow F2 is hashed to the node 312, the flow F3 is hashed to the node 313, and the flow F4 is hashed to the node 314. However, in some embodiments, there is no guarantee that the ECMP process 320 would route a packet to a node that the packet's flow is hashed to. For example, there is no guarantee that a packet belonging to the flow F2 is routed to the node 312 by the ECMP 320, even though the consistent hash 330 would hash the flow F2 to the node 312.

Figure 4:
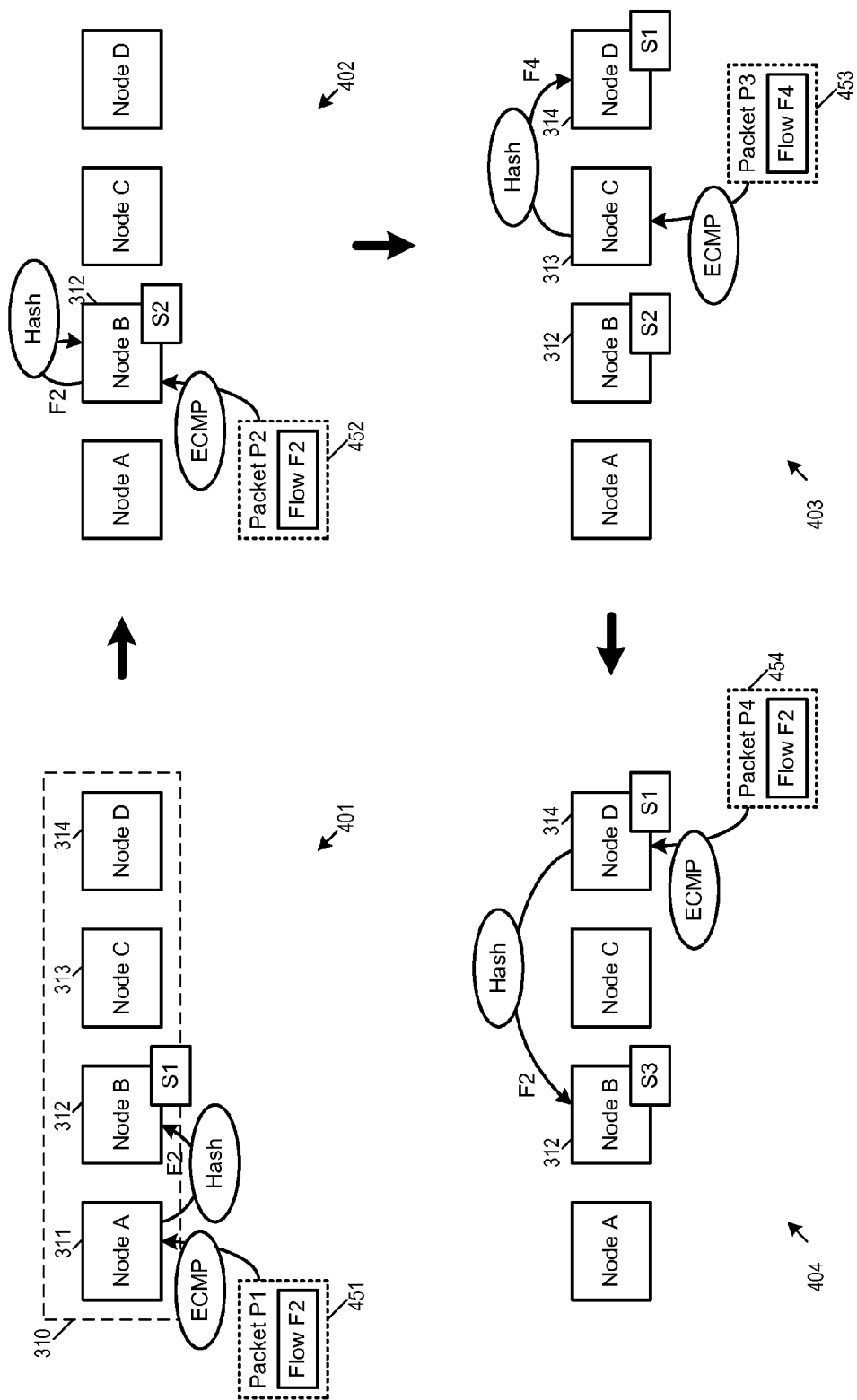
FIG. 4 illustrates the forwarding of packets among nodes in a cluster based on the consistent hash and ECMP.

Upon receiving a packet from the ECMP process, a node in some embodiments identifies the owner node of the flow and forwards the packet to the identified owner node. In some embodiments, each node in an edge cluster performs consistent hash on the flow identifiers in the packet (e.g., the five-tuple of source (IP) address, source port, destination (IP) address, destination port, transport protocol) in order to identify the flow's owner node. FIG. 4 illustrates the forwarding of packets according to consistent hashing of flows following ECMP routing.

FIG. 4 illustrates the forwarding of packets among nodes 311-314 in the cluster 310 based on the consistent hash and ECMP. The nodes 311-314 are respectively the owner nodes of flows F1, F2, F3, and F4. ECMP distributes packets 451-454 to nodes of the cluster 310. In four stages 401-404, the figure illustrates the forwarding of the packets 451-454, respectively.

At the first stage 401, the ECMP process routes the packet 451 to the node 311 (node A). The packet 451 belongs to the flow F2. The node 311 performs consistent hash on the flow identifier of the packet 451 and determines that the owner node of the flow F2 is the node 312 (node B). Based on this determination, the node 311 forwards the packet 451 to the node 312 for stateful processing, where the state of the flow F2 is being kept. As illustrated, the state of the flow F2 being kept at the node 312 becomes "S1".

At the second stage 402, the ECMP process routes the packet 452 to the node 312 (node B). The packet 451 also belongs to the flow F2. The node 312 performs consistent hash on the flow identifier of the packet 452 and determines that the owner node of the flow F2 is the node 312 itself. Based on this determination, the node 312 keeps the packet 452 for stateful processing. As illustrated, the state of the flow F2 at the node 312 has been updated to "S2" due to the stateful processing of the packet 452.

At the third stage 403, the ECMP process routes the packet 453 to the node 313 (node C). The packet 453 belongs to the flow F4. The node 313 performs consistent hash on the flow identifier of the packet 453 and determines that the owner node of the flow F4 is the node 314 (node D). Based on this determination, the node 313 forwards the packet 453 to the node 314 for stateful processing, where the state of the flow F4 is being kept. As illustrated, the state of the flow F4 being kept at the node 312 becomes "S1". On the other hand, the state of the flow F2 remains "S2" at the node 312.

At the fourth stage 404, the ECMP process routes the packet 454 to the node 314 (node D). The packet 454 belongs to the flow F2. The node 314 performs consistent hash on the flow identifier of the packet 454 and determines that the owner node of the flow F2 is the node 312. Based on this determination, the node 314 forwards the packet 454 to the node 432 for stateful processing, where the state of the flow F2 is being kept. As illustrated, the state of the flow F2 has become "S3".

As mentioned, in some embodiments, the edge cluster handles both northbound traffic into the network as well as southbound traffic out of the network. Regardless of the direction of the traffic and of the ECMP process being employed, the consistent hash is used to consistently identify the owner node of the flow. In other words, packets belonging to the same flow, regardless of the direction of traffic, would be statefully processed at the same owner node.

Figure 5:
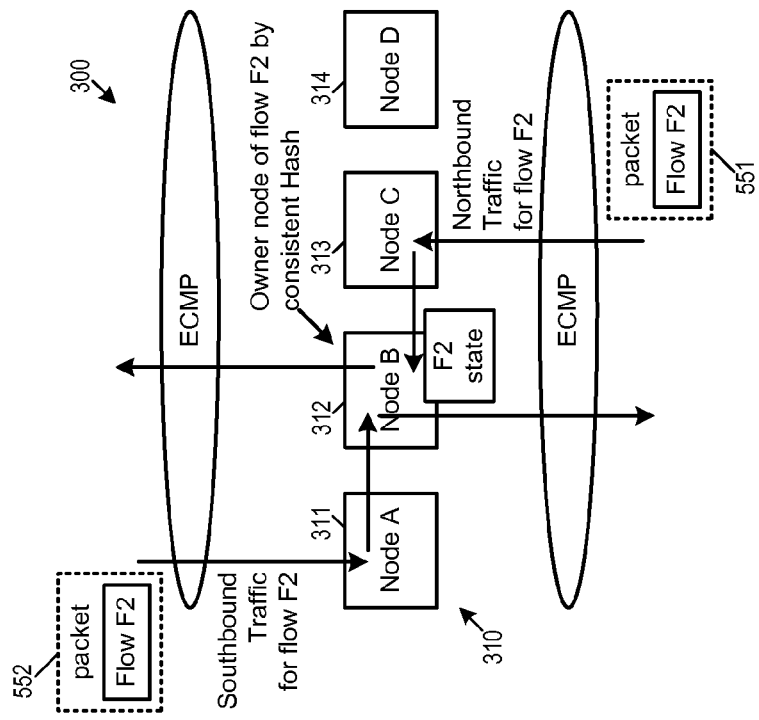
FIG. 5 illustrates the stateful processing of northbound and southbound traffic belonging to the same flow in a network.

FIG. 5 illustrates the stateful processing of northbound and southbound traffic belonging to the same flow in the network 300. FIG. 5 illustrates the forwarding path of a northbound packet 551 and the forwarding path of a southbound packet 552. Both packets 551 and 552 belong to the flow F2, whose owner node is the node B 312.

As illustrated, the northbound packet 551 is routed to node C 313 by ECMP. Node C in turn forwards the northbound packet 551 to node B 312 by consistent hash. The southbound packet 552 is routed to node A 311 by ECMP. Node A 311 then forwards the packet 552 to node B 312 by consistent hash. By using consistent hash, both node C and node A identifies the same owner node (node B 312) for the flow F2, even though the packets 551 and 552 are of different directions.

Some embodiments allow heterogeneous services support in a cluster. In some of these embodiments, the consistent hash function is based on the type of service that is invoked to serve the flow. Specifically, in some embodiments, different sets of nodes are used for different services, i.e., different services have different consistent hash functions based on different sets of nodes. For example, some embodiments have a first set of nodes for ALGs, a second set of nodes for NAT, and a third set of nodes for Firewall. So when a packet arrives, a node maps the flow of the packet to a service, say NAT, and use an input node set (provisioned for NAT) to the consistent hash, taking care of NAT services, and forwards the packet to the owner node according to the hash result. In some embodiments, different services are assigned different sets of nodes in the cluster based on e.g., whether a service is a "slow path" service (e.g., ALG) or a "fast path" service (e.g., firewall).

Figure 6A:
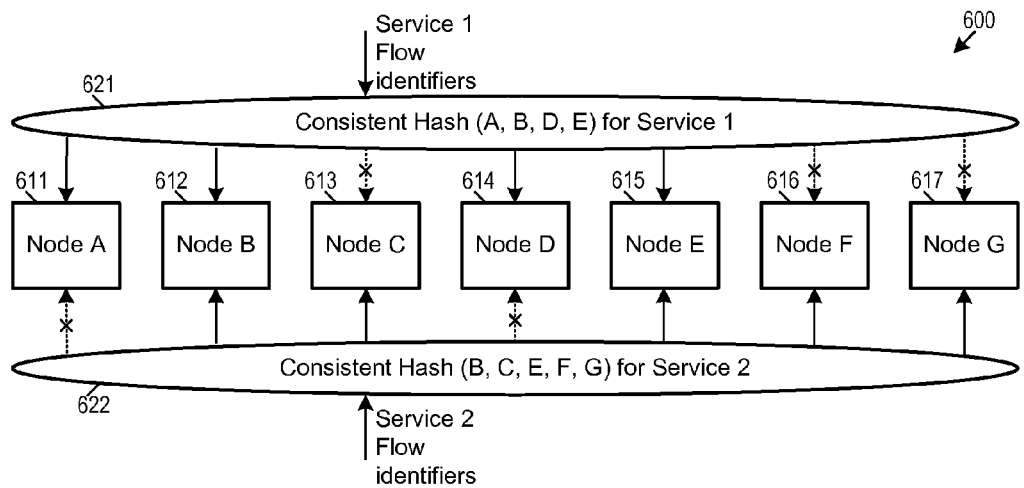
FIGS. 6a-b conceptually illustrates a cluster in which flows are assigned to different sets of nodes based on the services provided.
Figure 6B:
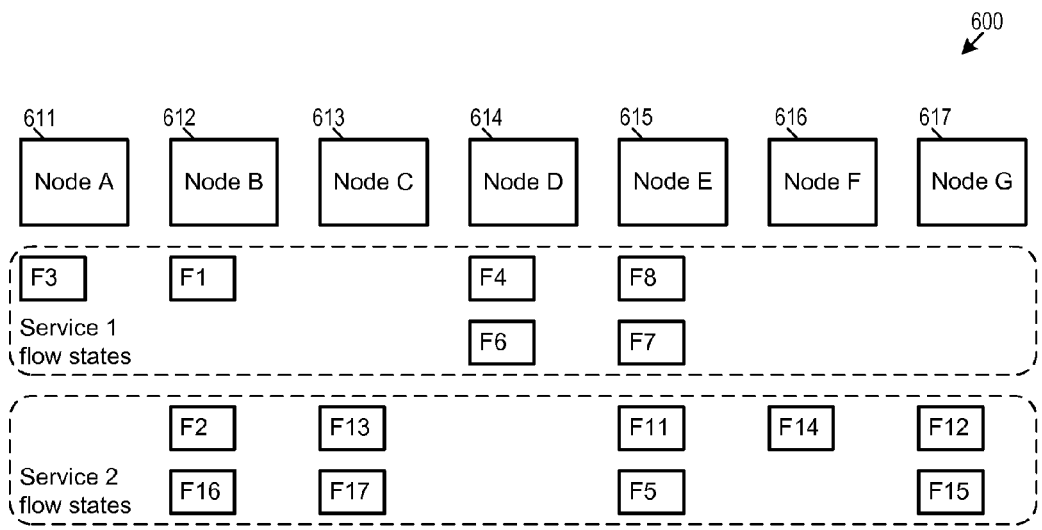

FIGS. 6*a-b* conceptually illustrates a cluster 600 in which flows are assigned to different sets of nodes based on the services provided. Specifically, the owner node of the flow of an incoming packet is identified by a consistent hash that is specific to the provided service. As illustrated in FIG. 6*a*, a first consistent hash function 621 is used to assign flows to nodes in the cluster 600 for a first edge service (e.g., ALG), while a second consistent hash function 622 is used to assign flows to nodes in cluster 600 for a second edge service (e.g., firewall.)

The cluster 600 has nodes 611-617 (nodes A through G). As illustrated, the first consistent hash function 621 is a hash function that is over nodes 611, 612, 614, and 615 (nodes A, B, C, E). The second consistent function 622 is a hash function that is over nodes 612, 613, 615, 616, 617 (nodes B, C, E, F, G). In other words, the flows using the first edge service are assigned only to nodes A, B, C, and E, and the flows using the second edge service are assigned only to nodes B, C, E, F, and G. Consequently, as illustrated in FIG. 6*b*, nodes A, B, D, and E are maintaining the states of flows that use the first edge service, while nodes B, C, E, F, and G are maintaining the states of flows that use the second edge service. In some embodiments, some nodes in the cluster can provide multiple different edge services. For example, nodes 612 and 615 (B and E) provides stateful edge services to both the first edge service and the second edge service and thus can be selected by either the first consistent hash function 621 or the second consistent hash function 622. In some embodiments not illustrated, each node in the cluster can only provide one type of edge service.

Figure 7:
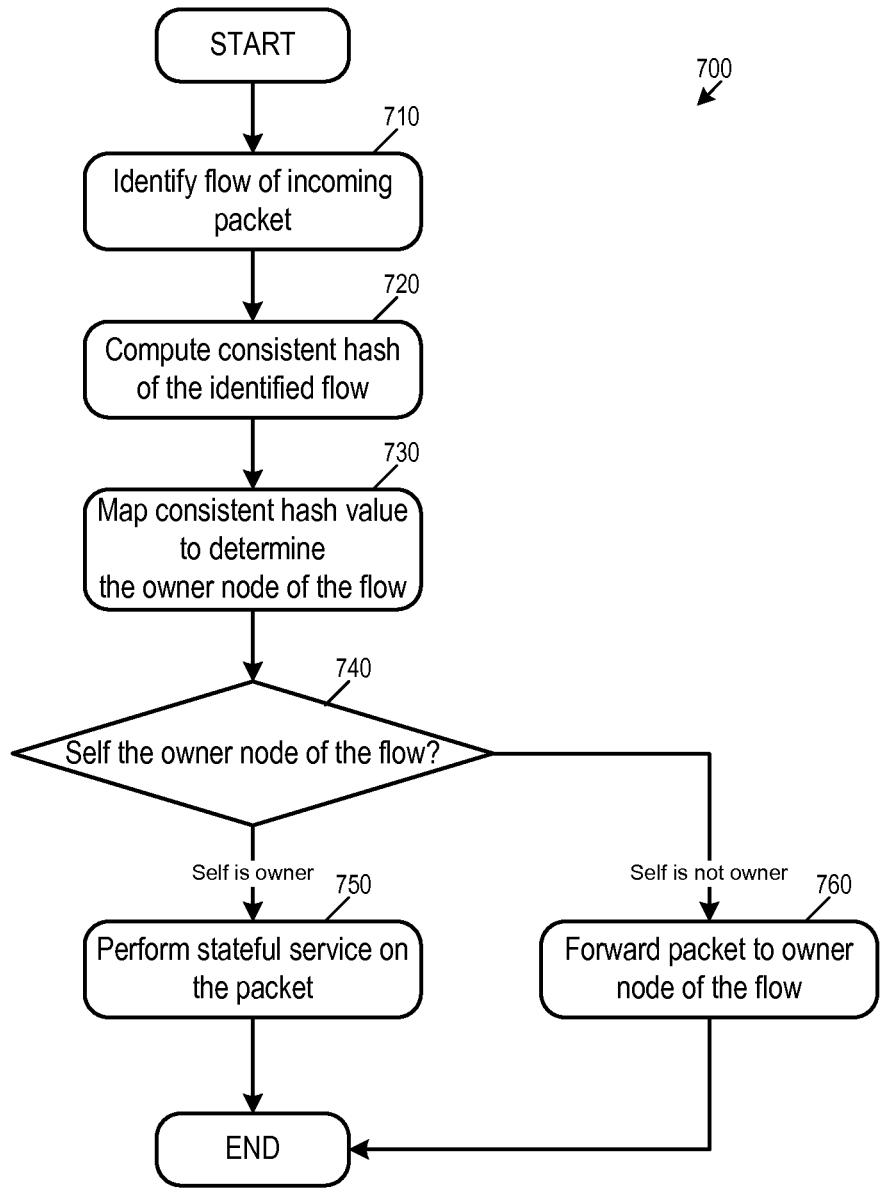
FIG. 7 conceptually illustrates a process for ensuring that the owner node of a flow is used to consistently perform stateful processes for the flow.

For some embodiments, FIG. 7 conceptually illustrates a process 700 for ensuring that the owner node of a flow is used to consistently perform stateful processes for the flow, regardless of where the packets of the flow are initially routed to (e.g., by ECMP). The process 700 is performed by an edge node in an edge service cluster in some embodiments. The process 700 starts when it receives a packet at the edge of the network, either southbound out to the external world or northbound into the network. This packet is in some embodiments initially distributed to the edge node by ECMP.

The process identifies (at 710) the flow of the incoming packet. In some embodiments, this identification is based on the flow identifiers in the packet, such as the source/destination addresses, source/destination ports, and protocol fields that in L3 and L4 headers of the packet.

The process then compute (at 720) the consistent hash of the identified flow by e.g., hashing the flow identifiers into a consistent hash value. In some embodiments, different consistent hash functions are used for different services as described by reference to FIG. 6 above. In some of these embodiments, the process uses the flow identifiers of the incoming packet to identify a specific edge service and then applies a corresponding consistent hash function for the identified edge service.

The process then maps (at 730) the consistent hash value to identify the owner node of the flow. Next, the process determines (at 740) if the edge node running the process 700 is the owner node of the flow. If the edge node is itself the owner node of the flow, the process proceeds to 750 to locally perform the stateful service on the packet based on the flow. If the edge node is not itself the owner node of the flow, the process proceeds to 760 to forward the packet to the identified owner node so the owner node can perform stateful service based on the flow. The process 700 then ends.

c. Delegating Flows

In some embodiments, the owner node identified by consistent hash of a particular flow is not the most suitable edge node to perform the stateful service on the flow. This is the case when the owner node of the flow identified by consistent hash does not have the requisite state information needed to properly process the flow, but rather such state information is kept at another node in the cluster. This other node can be a former owner node of the flow, or an owner node of a related flow whose state information is needed to properly process the flow. In order to provide consistent stateful service, the owner node identified by consistent hash in some embodiments delegates the packets to the node where the state information is kept.

In some embodiments, flow delegation is based on pinned flow tables and indirection tables that reside in nodes of the edge cluster. Each entry in an indirection table and a pinned flow table corresponds to a flow. Each indirection table entry instructs its edge node to forward or delegate packets belonging to the flow according to the entry. Each entry in a pinned flow table for a flow instructs its edge node to process the flow locally (hence pinning or anchoring the flow) and to provide stateful service for the flow, regardless of whether the node is the owner node of the flow.

Figure 8:
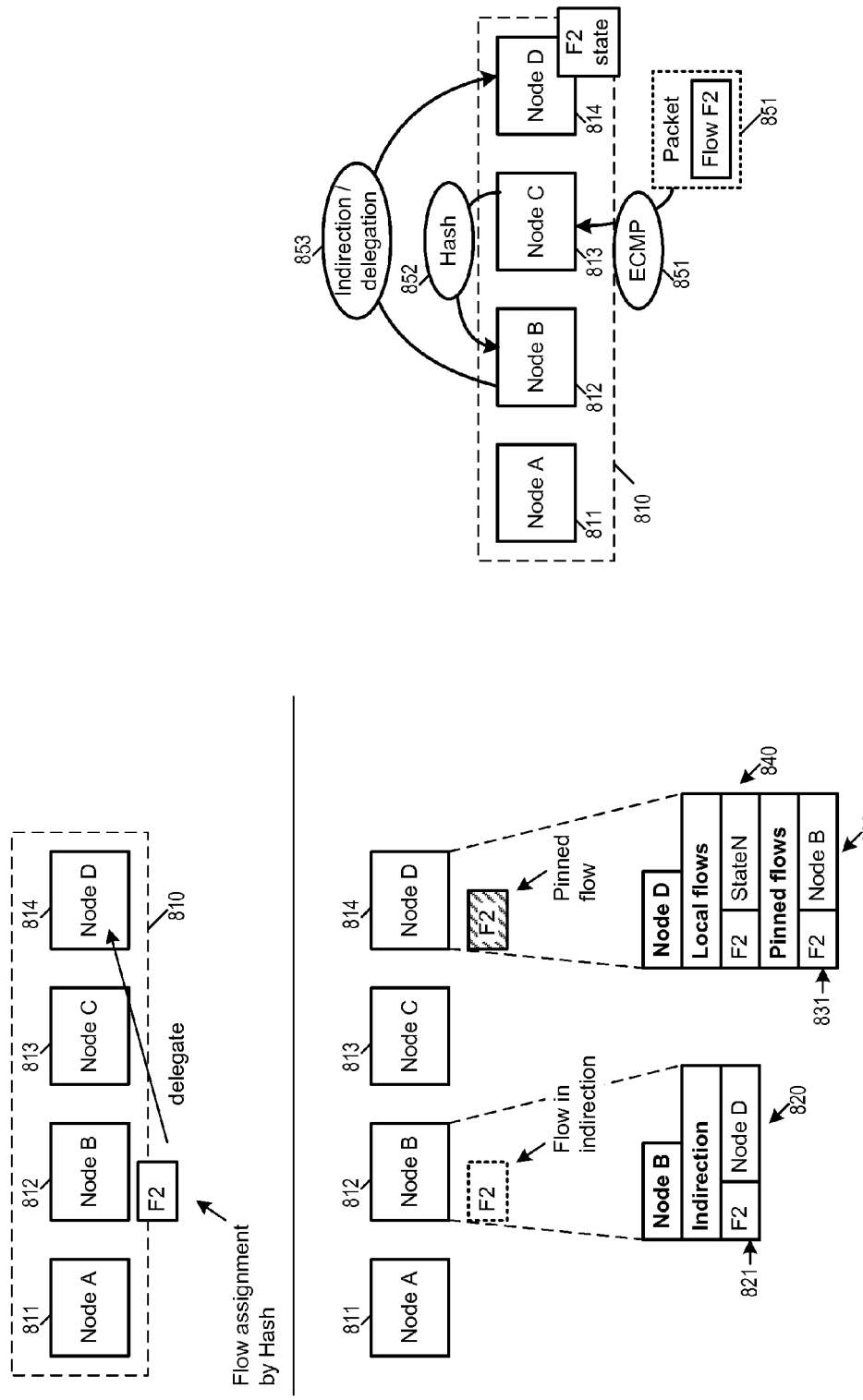
FIG. 8 illustrates the delegation of packets from the owner node of a flow to another node within an edge cluster.

FIG. 8 illustrates the delegation of packets from the owner node of a flow to another node within an edge cluster 810. The edge cluster includes edge nodes 811-814 (nodes A, B, C, and D respectively) that each can provide stateful services for a flow at the edge. An edge node 812 (node B) is assigned to be the owner node of the flow "F2" by consistent hash. However, the owner node B 812 has delegated the flow F2 to node D 814 as the delegated node such that node D rather than node B will be handling the stateful processing of the flow F2.

As illustrated, the delegation of the flow F2 is accomplished according to an indirection table 820 and a pinned flow table 830, respectively implemented in the owner node B (the owner node of flow F2) and node D (the delegated node). The indirection table 820 of node B has an entry 821 for the flow F2 that is pointed at the node D. This entry 821 instructs the node B to forward packets belonging to the flow F2 to the node D. The pinned flow table 830 of node D has an entry 831 that instructs node D to perform stateful service on packets belonging to the flow F2, even though node D is not the owner node of F2. Node D (814) also has as local flows table 840 that keeps track of the states of the flows that it is processing, which includes the pinned flow F2. In some embodiments (not illustrated), local flow table and pinned flow table are implemented as one table such that the edge node can use the entries in the local flow table to determine which flows are pinned to the node.

FIG. 8 also illustrates an example packet forwarding and flow delegating operations in the edge cluster 810. The example illustrates the forwarding of a packet 851 belonging to the flow "F2".

As illustrated, an ECMP process 851 forwards the packet 851 to the node C (813). However, node C is neither the owner node of the flow F2, nor a node that has F2 as a pinned flow. Since node B is the owner node of F2 according to consistent hash, the packet 851 is forwarded to node B. However, the indirection table 820 of node B has the entry 821 for the flow F2 that is pointing at node D, node B thus forwards the packet 851 to node D. Node D, though not the owner node of F2 according to consistent hash, nevertheless accept and perform stateful service on the packet 851. This is because node D's pinned flow table 830 has the entry 831 for the flow F2. (Though not illustrated, if the ECMP process routes a F2 packet to node D directly, node D would perform stateful service immediately based on its pinned flow table entry for F2 rather than forwarding the packet based on consistent hash.)

Figure 9:
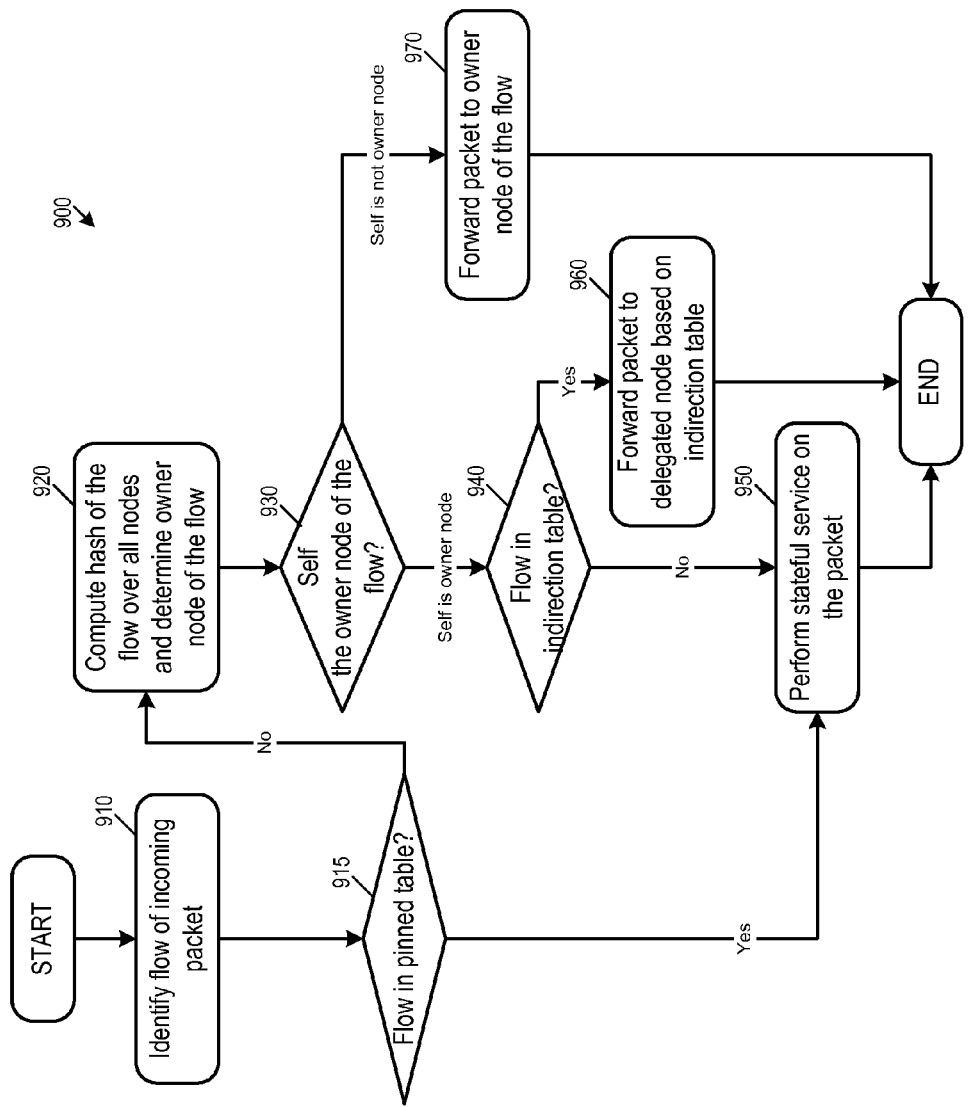
FIG. 9 conceptually illustrates a process for determining whether an edge node should forward a received packet or to perform stateful process on the received packet.

For some embodiments, FIG. 9 conceptually illustrates a process 900 for determining whether an edge node should forward a received packet or to perform stateful process on the received packet. The process 900 starts when the edge node receives an incoming packet. Such a packet can either be part of northbound traffic into the network or southbound traffic out to the external world (e.g., Internet, other sections of a data center, or other segments of a network).

The process identifies (at 910) the flow that the incoming packet belongs to. The flow of a packet is identifiable from the address/port fields in the packet's L2-L4 headers in some embodiments (e.g., five-tuple). The process then determines (at 915) whether the identified flow is in the pinned flow table of the edge node. A corresponding entry in the pinned flow table indicates to the edge node that the flow is to be statefully processed locally regardless of consistent hash. If the identified flow is in the pinned flow table (i.e., have a corresponding entry), the process proceeds to 950 to perform stateful service on the incoming packet. Otherwise, the process proceeds to 920.

At 920, the process performs consistent hash and computes a hash value for the flow. The computed hash value is then used to determine or identify the owner node of the flow. The consistent hash is limited to the nodes in the edge cluster so each flow would map to exactly one node in the cluster.

The process then determines (at 930) if the edge node performing the process is itself the owner node of the identified flow. If so, the process proceeds to 940. If this edge node is not the owner of the identified flow, the process proceeds to 970.

At 940, the process determines if the identified flow is in the indirection table of the edge node. At this operation, the process has determined that the edge node running the process is the owner node of the identified flow by consistent hash. However, a corresponding entry in the indirection table would indicate to the edge node that the flow has to be forwarded elsewhere for stateful processing. If the identified flow has a corresponding entry in the indirection table, the process proceeds to 960. Otherwise, the process proceeds to 950 to perform stateful service on the incoming packet as the owner node of the identified flow.

At 950, the process performs the required stateful service (e.g, firewall, NAT) on the packet. In some embodiments, this operation is based on the state information maintained by the edge node. The maintained state information is then accordingly updated based on content or type of the packet (e.g., SYN, ACK packet at beginning of TCP connection). The process 900 then ends.

At 960, the process forwards the packet to a delegated node in the cluster for stateful processing (even though the edge node running the process is the owner node of the flow). In some embodiments, the delegated node is identified by the entry in the indirection table for the identified flow (e.g., the entry 821 in the indirection table 820 identifying node D for F2). The process 900 then ends.

At 970, the process forwards the packet to the owner node of the flow. In some embodiments, nodes of a cluster are in a same L2 segment such that this forwarding is based on L2 protocol. The process 900 then ends.

d. Transferring State Information

As mentioned, in some embodiments, a node that is determined to be the owner node of a flow by consistent hash does not have the requisite state information to properly process the flow. Section I.c above describes methods in which the owner node delegates packets belonging to the flow to the node (e.g., the previous owner node) that is maintaining the requisite state information. Instead of the owner node forwarding packets to a delegate node at which the flow's state information is kept, some embodiments forward the state information to the owner node.

Figure 10:
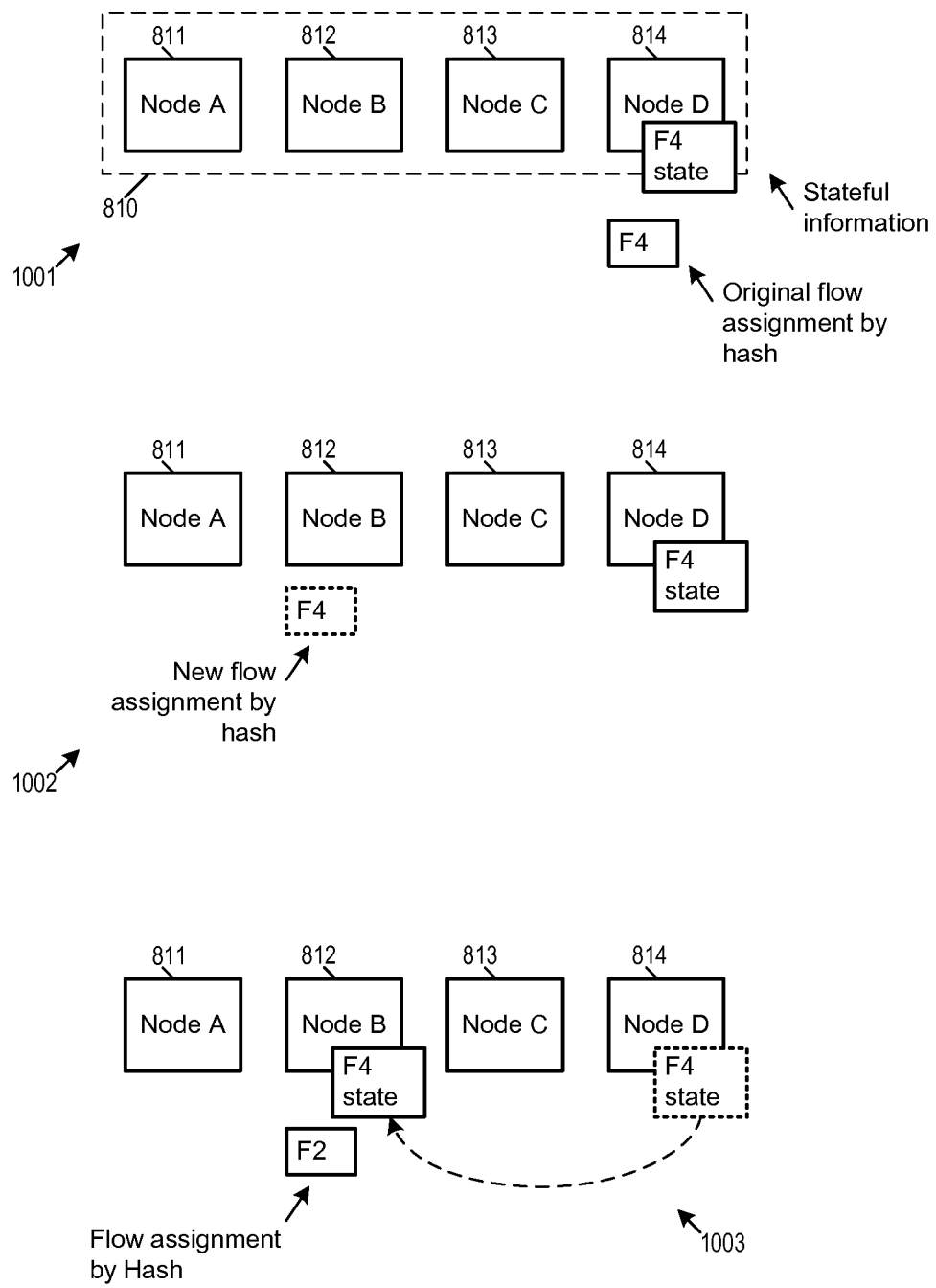
FIG. 10 illustrates the forwarding of state information to the owner node identified by consistent hash.

For some embodiments, FIG. 10 illustrates the forwarding of state information to the owner node identified by consistent hash. The figure illustrates the forwarding of state information in the edge cluster 810 in three stages 1001-1003.

The first stage 1001 shows the state information of a flow F4 being maintained at its original owner node 814 (node D). The node 814 has the state information for the flow F4 because it has been performing stateful service for the flow.

The second stage 1002 shows the selection of a different node, namely node B (812) as the owner node of the flow F4 by consistent hash. Such change in owner node assignment can occur because of changes to the membership of the edge cluster (e.g., node addition or removal), or because of owner node assignment override (e.g., related flows). However, the state information for F4 is still kept at node D, so node B cannot proper provide stateful service to flow F4 without the state information.

Third stage 1003 shows the forwarding of the state information for the flow F4. In some embodiments, such forwarding is by control plane messages between the nodes in the cluster, or by control messages with a network manager. The state information of F4 is transferred (or copied) from node D to node B so the information will be available for node B to provide stateful services for flow F4.

II. Dynamically Resizing Edge Node Cluster

In some embodiments, the identification of owner node is not only based on the hashing function used, but also on the membership of edge nodes in the cluster. In other words, the determination of which edge node is the owner node of a given flow is partially based on how many edge nodes are in the edge cluster that are capable of providing stateful services. Any change in the membership in the edge cluster would thus alter the result of consistent hash. For example, consistent hash would identify a first node as the owner node of a flow when there are M nodes in the edge cluster but would identify a second, different node as the owner node of the flow when there are N nodes in the cluster.

As mentioned, the size of the edge cluster can be changed to either add new nodes or removing existing nodes. Some embodiments allow this resizing of the edge cluster dynamically, i.e., while the edge cluster is actively handling and processing network traffic that utilizes stateful network services. The existing traffic flows through the edge continue to be processed during and after the changes to membership of the cluster. In order to provide the stateful services without interruption through the resizing of the edge cluster, some embodiments anchor stateful services for existing flows at their original owner nodes until those existing flows are complete. In some embodiments, the nodes in the edge cluster forward packets belonging to existing flows to their original owner nodes, which still maintain the state information of the existing flows necessary for the stateful services.

a. Adding Edge Nodes

Figure 11:
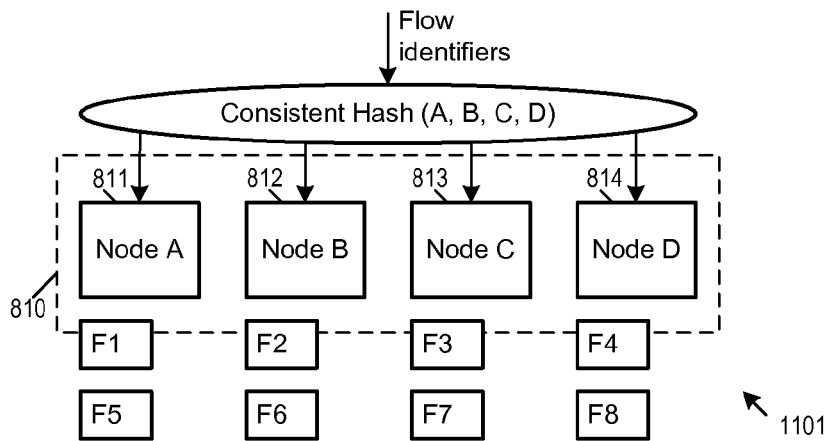
FIG. 11 illustrates how changes in membership of the edge cluster changes the assignment of flows to edge nodes by consistent hash.
Figure 11:
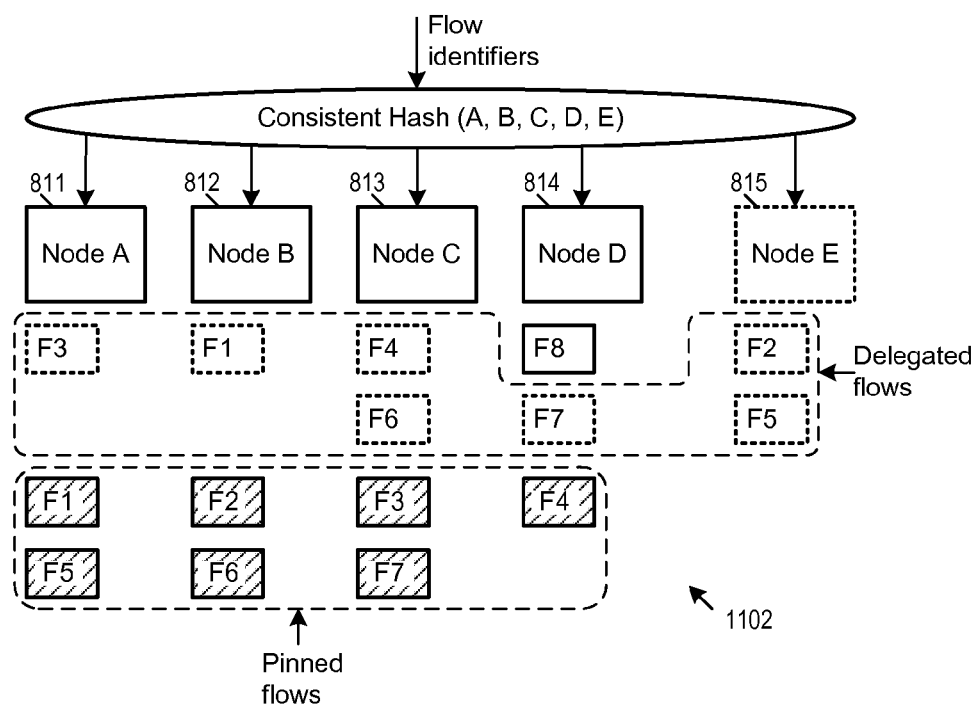

FIG. 11 illustrates how changes in membership of the edge cluster 810 changes the assignment of flows to edge nodes by consistent hash. Specifically, the figure illustrates the effect of adding a new fifth node E (815) to the cluster 810 of FIG. 8 in two stages 1101-1102. The edge cluster 810 originally has four node 811-814 (nodes A, B, C, D).

The first stage 1101 shows the assignment of owner node by consistent hash prior to the addition of node E. As illustrated, prior to adding node E, the consistent hash of flows is over nodes A, B, C, and D in order to identify an owner node from among these four nodes. Under this consistent hash function, flows F1 are F5 are assigned to node A (811), flows F2 and F6 are assigned to node B (812), flows F3 and F7 are assigned to node C (813), and flows F4 and F8 are assigned to node D (814). For this example, flows F1-F8 are assumed to be active, ongoing flows being statefully processed at by nodes A, B, C, and D.

The second stage 1101 shows the addition of new node E and its effect on the consistent hash. With addition of node E, the consistent hash is over nodes A, B, C, D, and E in order to identify an owner node from among these five nodes. Consequently, some of the flows F1-F8 are reassigned to different owner nodes. In this example, every flow except F8 is assigned a different owner node by consistent hash. Node A is now the owner node of F3, node B is now the owner node of F1, node C is now the owner node of F4 and F6, and node D is now the owner node of F7 and F8. The new added node is assigned to be the owner node of F2 and F5.

Though the addition of new node has cause the existing flows (F1-F8) to be assigned to new owner nodes, the state information of the existing flows are still kept at their original owner node. In order to continue the stateful services correctly for those flows, some embodiments use indirection tables and pinned flow tables to delegate packets so packets belonging to the existing flows are processed with the correct state information.

Figure 12A:
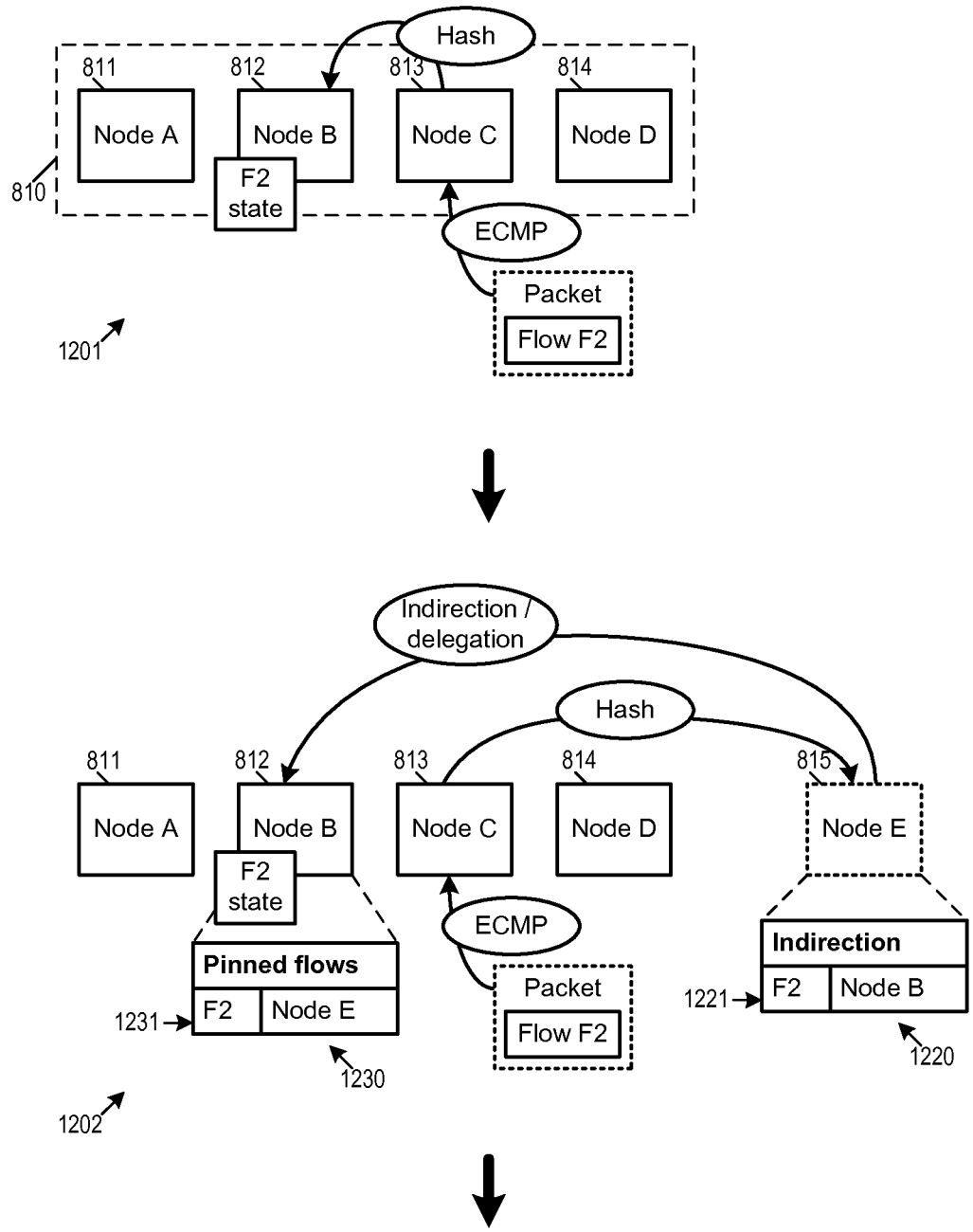
FIG. 12a-b illustrates the forwarding of packets due to the addition of a new node to the edge cluster.
Figure 12B:
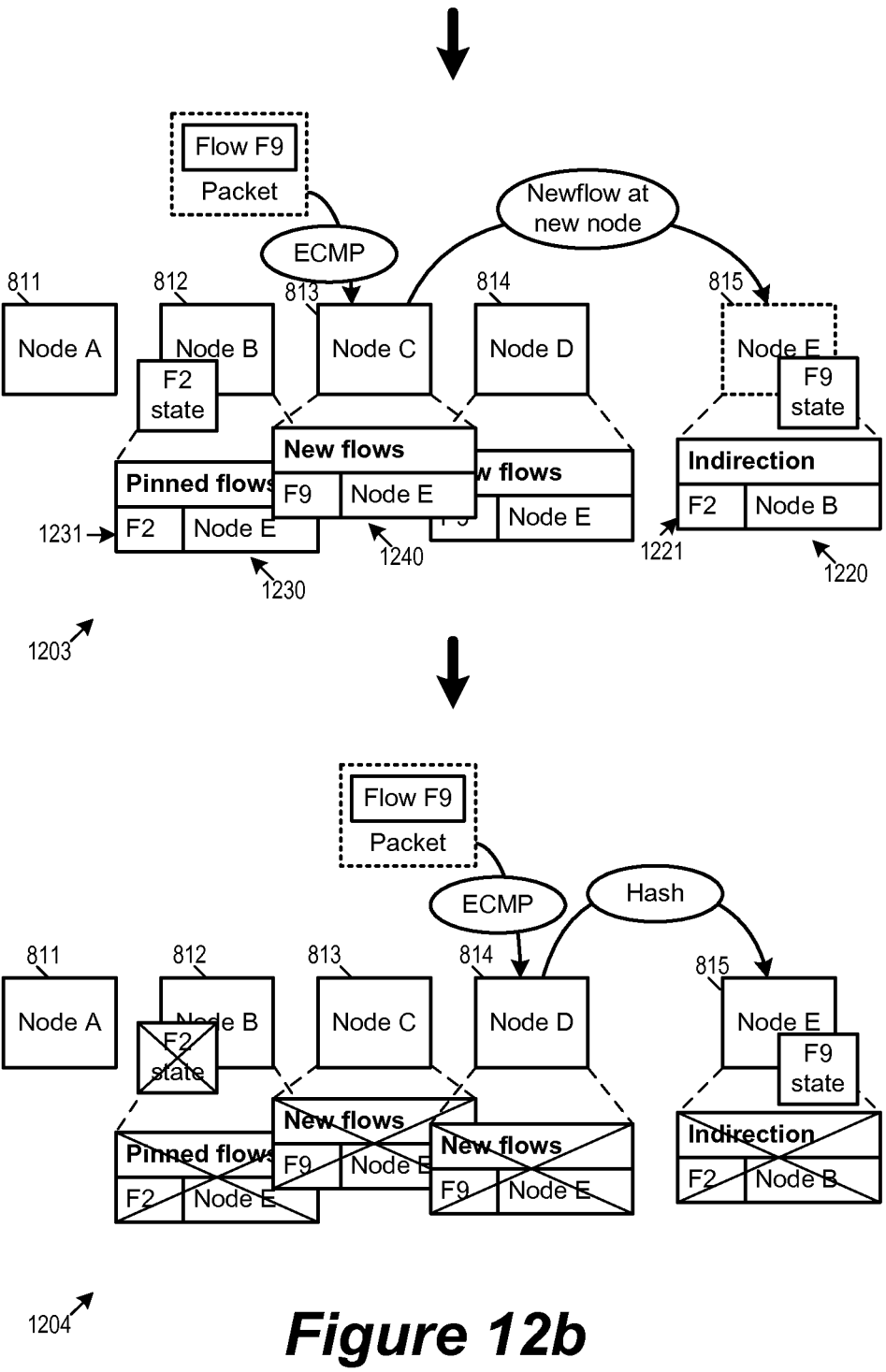

FIG. 12a-b illustrates the forwarding of packets due to the addition of the new node 815 to the edge cluster 810. This addition takes place while node B (812) is still performing stateful service for the flow F2, node B being the original owner node of the flow F2 before the addition of the new node. The figure illustrates the handling of the node addition in four stages 1201-1204.

The first stage 1201 shows the state of the edge cluster 810 prior to the addition of node E (815). As illustrated, node B 812 is the owner node of the flow F2 by consistent hash. It is maintaining the state information related to F2, and packets belonging to F2 are forwarded to node B for stateful processing, even when ECMP initially route the packets elsewhere.

The second stage 1202 shows the handling of the flow F2 by the cluster 810 immediately after the addition of the new node (node E 815). The addition of the node 815 (node E) causes consistent hash to identify the new node 815 as the owner of the flow F2 rather than node B 812 (F2's original owner node.) However, the state information for F2 is still kept at node B. Node E 815 (new owner node of F2 by consistent hash) therefore forwards packet in the flow F2 to node B 812 (original owner node of F2) for stateful services rather than performing the stateful service itself.

As illustrated, node E has an indirection table 1220 that has an entry 1221 for F2 that points at the node B. Any packet belonging to F2 arriving at node E (whether by ECMP or by consistent hash) will be forwarded/delegated to node B according to this indirection table entry. Furthermore, node B has a pinned flow table 1230 that has an entry 1231 for the flow F2. This entry instructs Node B to keep any packets belonging to F2 for processing rather than forwarding it elsewhere, even though it is no longer the owner node by consistent hash.

The third stage 1203 shows the handling of a new flow F9 during the addition of node E. A new flow (e.g., F9) is a flow that starts after the resizing of the cluster. Such a flow does not have an original owner node, and that it has no extant state information that is needed for correct stateful processing. A new flow therefore can be processed by its owner node according to consistent hash without delegation. In some embodiments, each node keeps a new flow table (e.g., 1240) to keep track of new flows that are added during the resizing of the cluster. This is necessary because in some embodiments, newly added nodes are not recognized by the ECMP process and cannot receive packets directly from the ECMP. A node receiving a packet from ECMP can consult the new flow table and directly forward the packet to the owner node, even if this owner node is the newly added node. In this example, node C (813) receives the packet 1253 from ECMP and directly forwards the packet to node E based on node C's new flow table 1240, which has an entry 1241 that corresponds to the new flow F9. Though node E is a new node in the cluster, it is able to process flow F9 immediately as F9's owner node because F9 is new flow that can be processed without regard for extant state information.

The fourth stage 1204 shows the completion of the flow F2 by node B. Since F2 is an existing flow since before the addition of Node E, its completion also frees Node E from having to delegate F2 packets to node B based on its indirection table 1220. Node B likewise is also freed from having the keeping an entry in its pinned flow table 1230 for F2. Consequently, the addition of the new node is deemed complete. The new flow F9 however will continue to be processed by node E until its completion. However, in some embodiments, the new flow tables (e.g., the new flow table 1240 in node C) in the cluster will purge themselves of entries related to F9 when F9's owner node (node E) joins the ECMP and thus no longer considered a new node.

Figure 13:
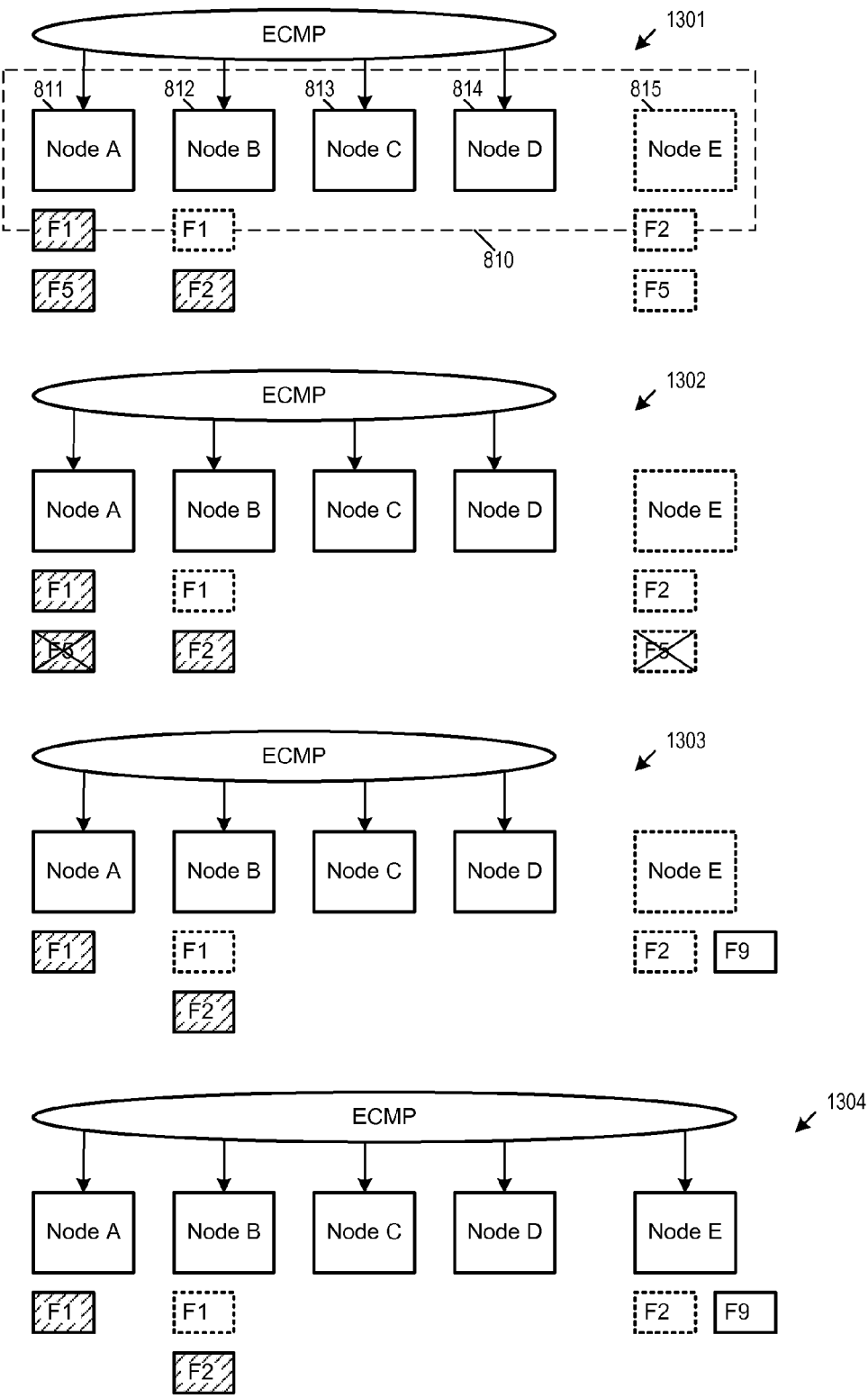
FIG. 13 conceptually illustrates an ECMP process for an edge cluster during and after the learning mode for a newly added node.

Upon the addition of a new node, the edge cluster is considered to be in a learning mode for the new node until the new node has joined the ECMP process and starts to receive packets directly from ECMP. As soon as this occurs, the new flow tables are no longer necessary as nodes in the cluster (including the newly added node) can receive ECMP packets and can forward packets to their flows' rightful owner nodes based on the consistent hash over all nodes in the cluster. The pinned flow tables and indirection tables can remain in operation until those pre-existing flows (from before the node addition) complete their operations. FIG. 13 conceptually illustrates ECMP process for the edge cluster 810 during and after the learning mode for a newly added node. The figure illustrates the addition of node E in four stages 1301-1304.

Before the cluster is resized (i.e., steady state, not illustrated), node A is providing stateful service for flows F1 and F5 while node B is providing stateful service for flow F2, as nodes A and B are the owner nodes of F1, F5, and F2 according to consistent hash over nodes A, B, C, and D. The ECMP process is distributing packets to all four nodes in the cluster.

The first stage 1301 shows the edge node immediately after the addition of node E, i.e., the cluster 810 has just entered learning mode for node E. Under the new consistent hash over nodes A, B, C, D, and E, the new owner for flow F1 is node B, while the new owner of the flows F2 and F5 is node E. As existing flows that were started before the addition of node E, flows F1, F2, and F5 are anchored to their original owner nodes by pinned flow tables and indirection tables. The ECMP process in the meantime continue to distribute packets to only nodes A, B, C, and D. The new node E would not receive packets directly from ECMP process during the learning mode.

The second stage 1302 shows completion of flow F5 by node A. This means node A no longer needs to process F5 as a pinned flow and node E no longer has to delegate packets of F5 to node A according to its indirection table.

The third stage 1303 shows the addition of a new flow F9, whose owner node is the newly added node E. As illustrated, the ECMP process at this stage still does not distribute packet to the newly added node E, so other nodes in the cluster (node A, B, C, D) would have to forward ECMP packets of F9 to node E for stateful processing based on entries for F9 in new flow tables.

The fourth stage 1304 shows the cluster 810 in new steady state after the learning mode for node E has completed. The ECMP process now includes node E such that incoming packets can be distributed to all of the nodes in the cluster, including the newly added node E. The new flow F9 also continues to be processed by node E, though entries of F9 in new flow tables in the cluster 810 are no longer necessary and thus purged. Pinned flows (i.e., pre-existing flows from before the addition of node E) such as F1 and F2 continues to be statefully serviced in their original owner nodes by indirection tables and pinned flow tables until the completion of those flows.

Figure 14:
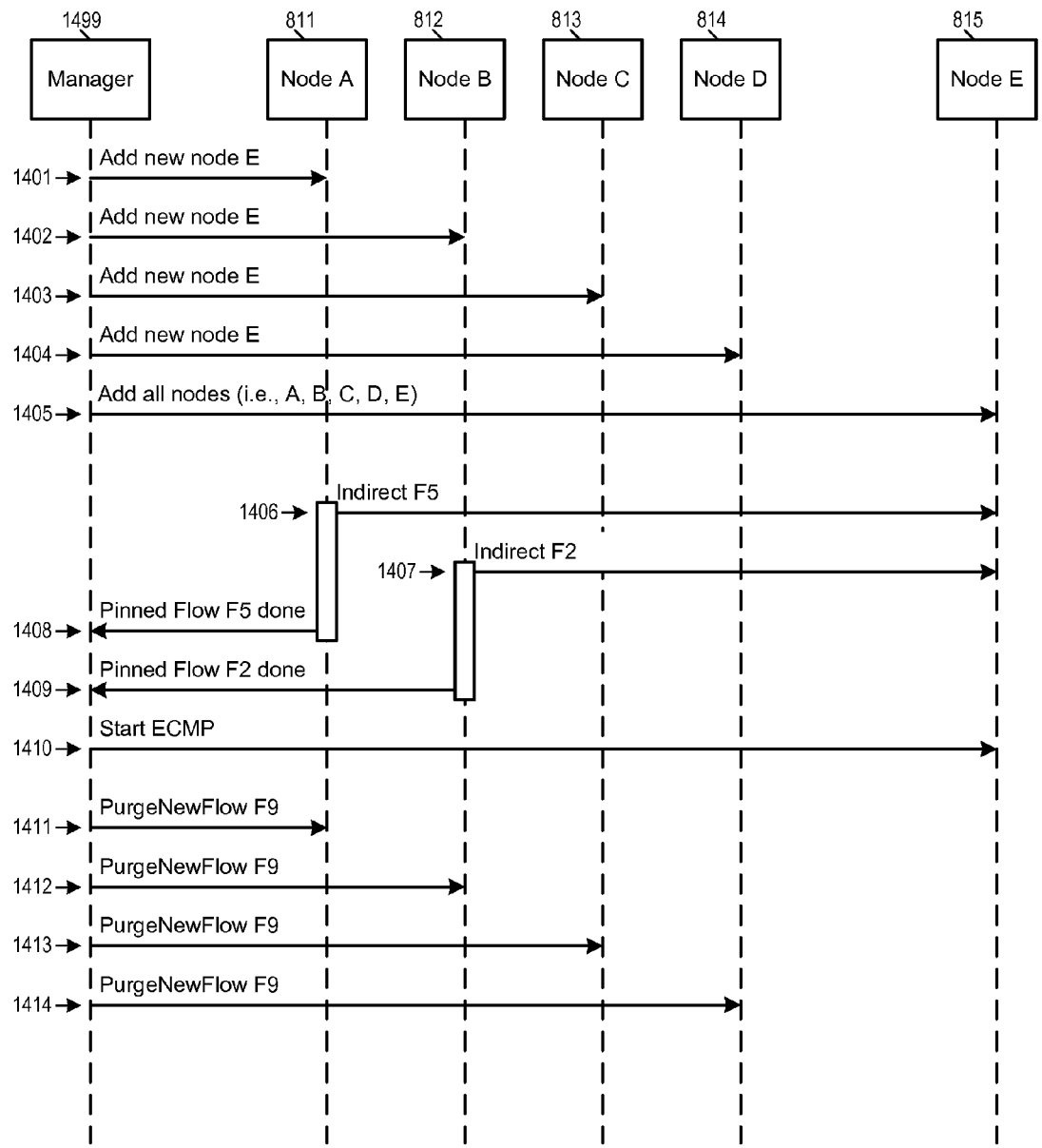
FIG. 14 illustrates an example sequence of control messages between a network manager and the edge nodes.

In some embodiments, the addition of a new node into a cluster is controlled by a network manager. In some embodiments, a network manager controls the resizing of an edge cluster by exchanging control plane messages with the nodes in the edge cluster. FIG. 14 illustrates an example sequence of control messages 1401-1414 between a network manager 1499 and the edge nodes 811-815 (nodes A, B, C, D, and E) for adding the new node 815 (node E) into the edge cluster 810. Before the sequence of message exchanges, only the nodes 811-814 (nodes A, B, C, and D) are active in the cluster 810.

The manager 1499 sends the messages 1401-1404 to nodes 811-814, respectively, informing these nodes that a new node (node E) is to be added to the cluster. The manager 1499 also sends the message 1405 to the newly added node 815 (node E). It is for informing the new node (node E) what nodes are in the cluster, which will include nodes A, B, C, D, and E.

Next, node A sends a message 1406 to node E instructing node E to forward packets in the flow F5 to node A (e.g., by creating an entry in its indirection table). Node B on the other hands sends a message 1407 to node E instructing node E to forward packets in the flow F2 to node B. Messages 1406 and 1407 are generated because the addition of new node E has shifted the owner node assignments of flows F5 and F2 from nodes A and B to node E as discussed by reference to the example of FIGS. 11-13 above. Nodes A and B then proceeds to process F5 and F2 as pinned flows.

When node A has finished the pinned flow F5, it sends the message 1408 to the manager 1499 to indicate that it has completed the pinned flow F5. Likewise, when node B has finished the pinned flow F2, it sends a message 1409 to the manager 1499 to indicate that it has completed the pinned flow F2. Since the flows F2 and F5 are pinned flow whose owner node is the newly added node (node E), the manager would understand that the learning mode for node E is complete and node E may participate in ECMP. Consequently, the manager 1499 sends the message 1410 to node E informing it to start the ECMP process.

In this example (i.e., the example of FIG. 11-13), a new flow F9 is hashed to the new node (node E) during the learning mode, and thus each of the existing nodes has a new flow table entry for the flow F9 as a new flow hashed to a new node. Upon completion of the learning mode for node E, the manager 1499 sends messages 1411-1414 to nodes 811-814 respectively to purge their new flow tables of any entries for flow F9.

Figure 15:
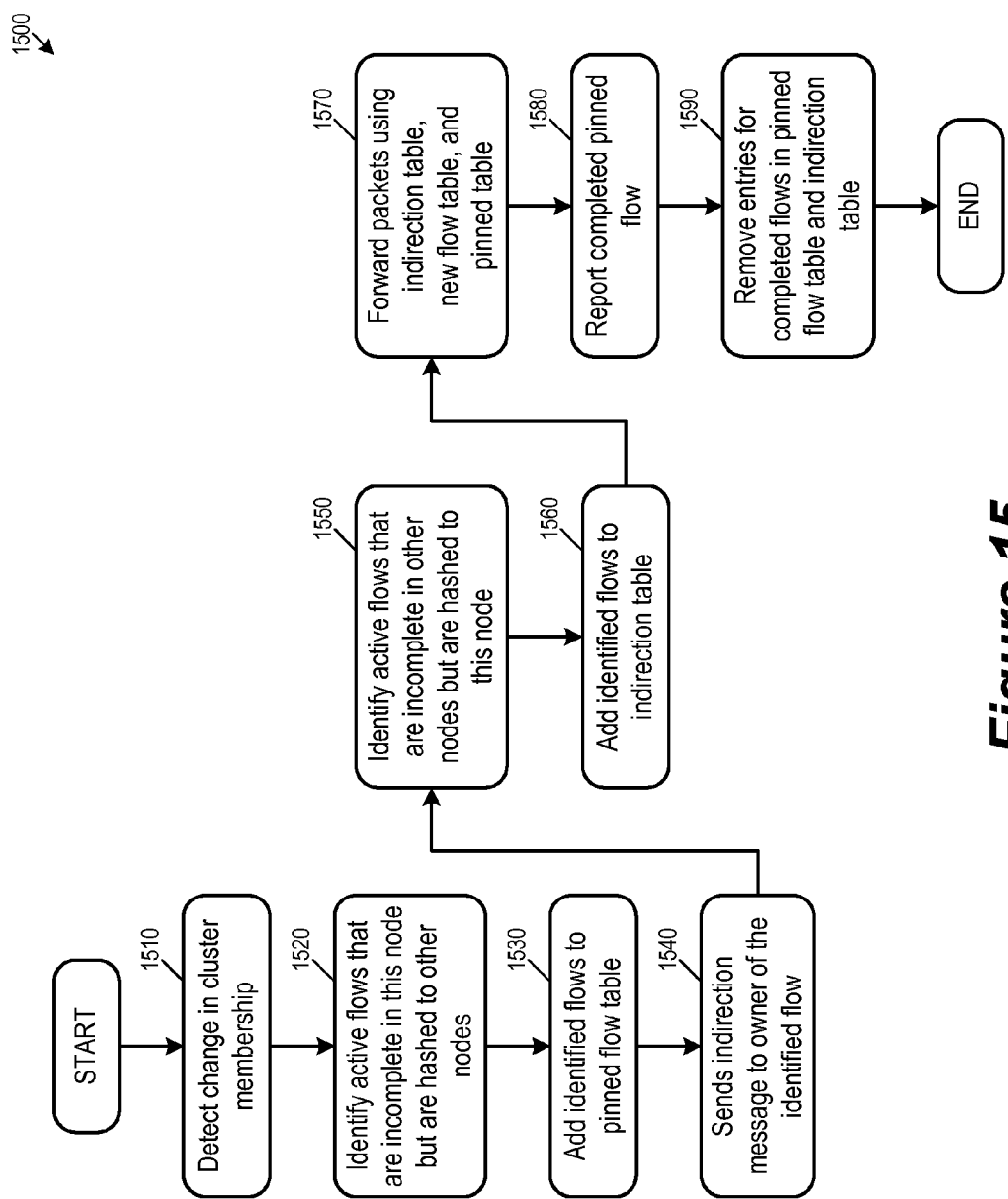
FIG. 15 conceptually illustrates a process for managing these tables at an edge node during cluster resizing.

As mentioned, continuous, uninterrupted stateful service of active flows through resizing of an edge cluster relies on delegation of packets between nodes that are chosen to be the owner nodes of those flows and nodes that still holds the state information of those flows. In some embodiments, these packet forwarding operations rely on a set of tables such as the indirection table, the pinned flow table, and the new flow table as discussed above by reference to FIGS. 8 and 12 above. For some embodiments, FIG. 15 conceptually illustrates a process 1500 for managing these tables at an edge node during cluster resizing.

The process 1500 starts when it detects (at 1510) a change in membership in the edge cluster. Such a change in membership causes changes in flows-to-nodes assignment via consistent hash. In some embodiments, an edge node knows of such a change because it has received a control plane message from the network controller (e.g., the message 1401-1405) that a new node has been added to the cluster.

The process then identifies (at 1520) active flows that are incomplete (i.e., still active) in this edge node but are assigned to other nodes due to the change in consistent hash. Next, the process adds (at 1530) the identified flows as an entry its pinned flow table. This informs the edge node to perform stateful service on packets of the identified flow even though it is no longer the flow's owner node. The process then sends (at 1540) indirection message to the owner node of the identified flow so the owner node would know to delegate the flow to this edge node.

Next, the process identifies (at 1550) active flows that are incomplete (i.e., still active in other nodes) but are hashed to this node. In some embodiments, this is based indirection messages received (e.g., messages 1406 and 1407 of FIG. 14), which are generated by edge nodes that have incomplete flows that have been re-assigned to this edge node. The process then adds (at 1560) these identified flows as entries to indirection table. The edge node running the process will have to delegate packets of these flows according to those entries in the indirection table.

With pinned flow table and indirection table updated, the process next forwards (at 1570) packets or performs stateful service on packets by referencing entries in the indirection table, the pinned flow table, and the new flow table. In some embodiments, entries in the new flow table are updated when the edge node encounters new started flows. The management of the new flow table will be further described below by reference to FIG. 16. The process then reports (at 1580) pinned flows that are complete and removes (at 1590) corresponding entries in the pinned flow table and the indirection table for those completed flows. In some embodiments, edge nodes completing pinned flows report the flow completions by control plane messages so edge nodes having corresponding entries in their indirection table would know to remove those entries and stop delegating those flows. Some embodiments include time-out mechanisms that automatically remove an entry in the indirection tables and the pinned flow tables after some period of inactivity in the corresponding flow. The process 1500 then ends.

Figure 16:
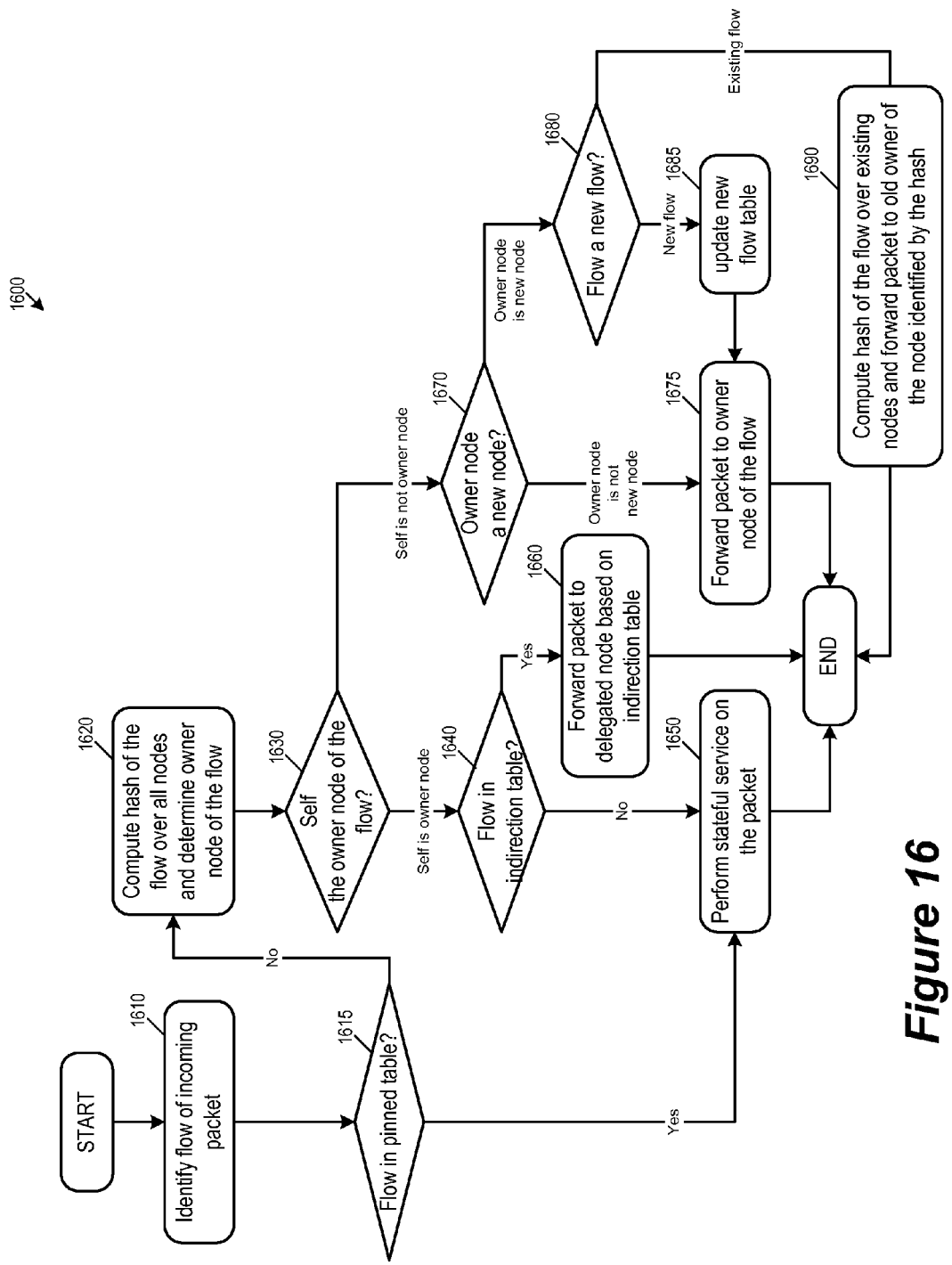
FIGS. 16-17 conceptually illustrates processes for packet delegation between edge nodes in a cluster based on pinned flow tables, indirection tables, and new flow tables.
Figure 17:
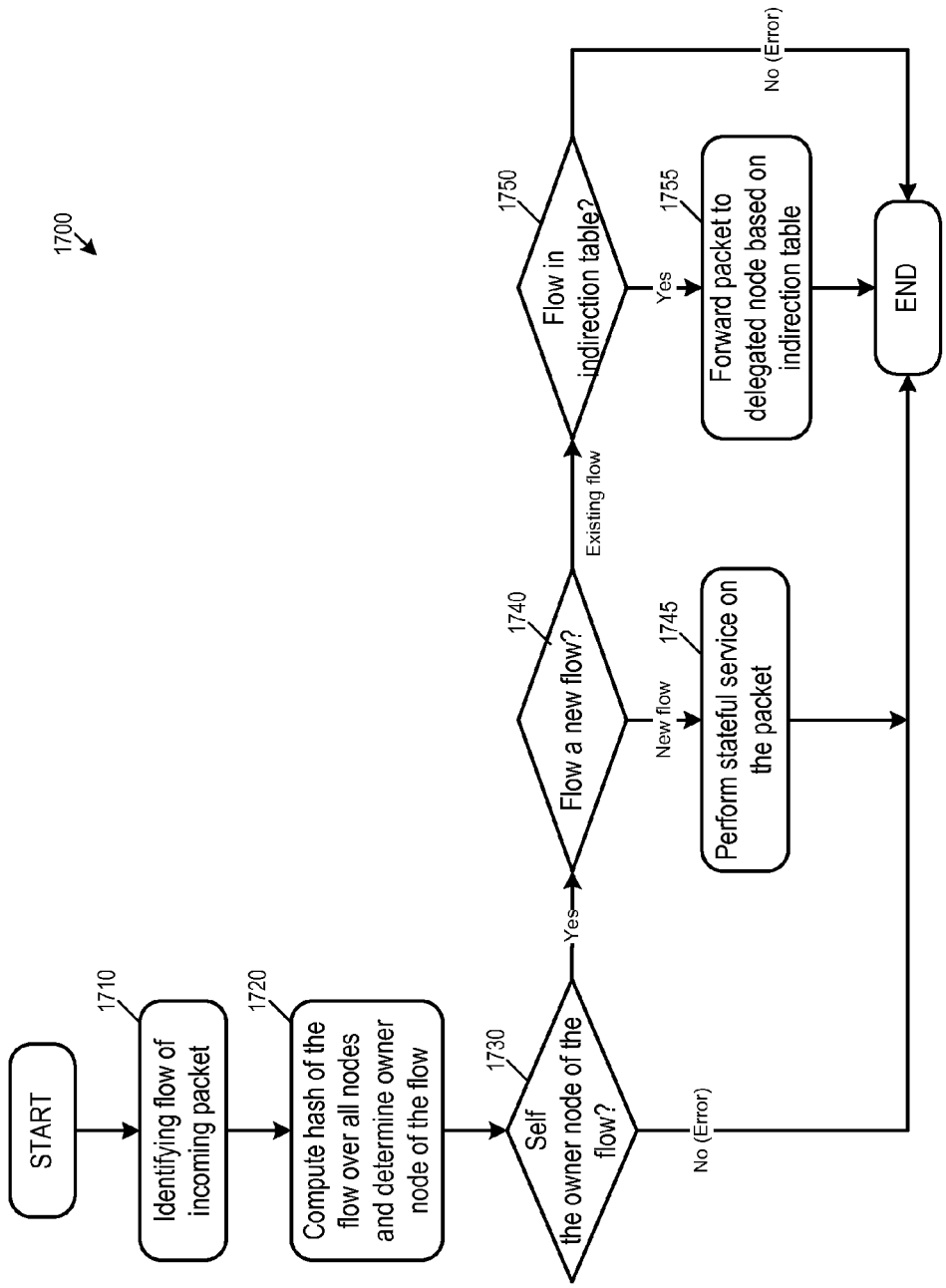

FIGS. 16-17 conceptually illustrates processes 1600 and 1700 for packet delegation between edge nodes in a cluster based on pinned flow tables, indirection tables, and new flow tables. The process 1600 of FIG. 16 is performed by an existing edge node during the learning mode for a newly added node, while the process 1700 of FIG. 17 is performed by the newly added node during the corresponding learning mode.

The process 1600 of FIG. 16 starts by identifying (at 1610) the flow of the incoming packet. The flow of a packet is identifiable from the address/port fields in the packet's L2-L4 headers in some embodiments (e.g., five-tuple). The process then determines (at 1615) whether the identified flow is in the pinned flow table of the edge node. A corresponding entry in the pinned flow table indicates to the edge node that the flow is to be statefully processed locally regardless of consistent hash. If the identified flow is in the pinned flow table (i.e., have a corresponding entry), the process proceeds to 1650 to perform stateful service on the incoming packet. Otherwise, the process proceeds to 1620.

At 1620, the process performs consistent hash and produces a hash value for the flow. The computed hash value is then used to determine or identify the owner node of the flow. The consistent hash includes the newly added node so the hash result can include the newly added node.

The process then determines (at 1630) if the edge node performing the process is itself the owner node of the identified flow. If so, the process proceeds to 1640. If this edge node is not the owner of the identified flow, the process proceeds to 1670.

At 1640, the process determines if the identified flow is in the indirection table of the edge node. At this operation, the process has determined that the edge node running the process is the owner node of the identified flow by consistent hash. However, a corresponding entry in the indirection table would indicate to the edge node that the flow has to be forwarded elsewhere for stateful processing. If the identified flow has a corresponding entry in the indirection table, the process proceeds to 1660. Otherwise, the process proceeds to 1650 to perform stateful service on the incoming packet as the owner node of the identified flow.

At 1650, the process performs the required stateful service (e.g, firewall, NAT) on the packet. In some embodiments, this operation is based on the state information maintained by the edge node. The maintained state information is then accordingly updated based on content of the packet. The process 1600 then ends.

At 1660, the process forwards the packet to a delegated node in the cluster for stateful processing (even though the edge node running the process is the owner node of the flow). In some embodiments, the delegated node is identified by the entry in the indirection table for the identified flow. The process 1600 then ends.

At 1670, the process determines if the owner node based on consistent hash is the newly added node. If the owner node is the newly added node, the process proceeds to 1680. Otherwise, the process 1600 proceeds to 1675 to forward the packet to the owner node of the flow.

At 1680, the process determines if the flow is a new flow that is assigned to a new node. Unlike an existing flow that has existing state information stored in its original owner node, a new flow has no original owner node or pre-existing state information and is therefore free to start stateful processing at its owner node, whether a newly added node or an existing node. In some embodiments, the process determines whether a flow is a new flow by examining entries in its new flow table. If the flow of the packet is a newly added flow, the process proceeds to 1685. If the flow is not a newly added flow (i.e., a pre-existing flow), the process proceeds to 1690.

At 1685, the process updates the new flow table at the edge node, i.e., if there is no entry in the new flow table for the flow, the process adds a corresponding entry into the new flow table. The process then proceeds to 1675 to forward the packet to the owner node of the new flow.

At 1675, the process forwards the packet to the owner node of the flow, the owner node being the one identified according the consistent hash that includes the newly added node. The process 1600 then ends.

At 1690, the process computes the hash of the flow over existing nodes only (i.e., by excluding the newly added node). This hash yields the original owner node of the flow. This operation is needed if the flow is an existing flow and yet the edge node does not have a corresponding entry in its indirection table. Consequently the process has to compute hash value based on the existing nodes in the cluster (excluding the newly added node) in order to determine/reconstruct which node is the flow's original owner. The process then forwards the packet to this original owner based on this computed hash. The process 1600 then ends.

The process 1700 of FIG. 17 starts by identifying (at 1710) the flow of the incoming packet. The flow of a packet is identifiable from the address/port fields in the packet's L2-L4 headers in some embodiments (e.g., five-tuple).

At 1720, the process performs consistent hash and computes a hash value for the flow. The computed hash value is then used to determine or identify the owner node of the flow. The consistent hash includes the newly added node so the hash result can include the newly added node. The process then determines (at 1730) if the newly added node is itself the owner node of the identified flow. If so, the process proceeds to 1740. If this newly added node is not the owner of the identified flow, the process 1700 ends as this is an error condition. A newly added node should not receive any packet of flow for which the newly added node is not the owner.

At 1740, the process determines if the flow is a new flow that is assigned to a new node. Unlike an existing flow that has existing state information stored in its original owner node, a new flow has no original owner node or pre-existing state information and is therefore free to start stateful processing at its owner node, whether a newly added node or an existing node. In some embodiments, the process determines whether a flow is a new flow by examining entries in its new flow table. If the flow of the packet is a newly added flow, the process proceeds to 1745. If the flow is not a newly added flow (i.e., a pre-existing flow), the process proceeds to 1750.

At 1750, the process determines if the identified flow is in the indirection table of the edge node. At this operation, the process has determined that the newly added node running the process is the owner node of the identified flow by consistent hash. However, a corresponding entry in the indirection table would indicate to the newly added node that the flow has to be forwarded elsewhere for stateful processing. If the identified flow has a corresponding entry in the indirection table, the process proceeds to 1755. Otherwise, the process 1700 ends because a newly added node should not receive a packet for an existing flow without a corresponding entry in the indirection table.

At 1755, the process forwards the packet to a delegated node in the cluster for stateful processing (even though the newly added node running the process is the owner node of the flow). The process 1700 then ends.

Some embodiments allow multiple edge nodes to be added to the cluster simultaneously. In some of these embodiments, the cluster enters learning mode for multiple edge nodes at once, while pinned flow tables and indirection tables are likewise used to delegate packets for flows that are anchored/pinned to their original owner nodes. Some embodiments add multiple edge nodes to the cluster by adding one edge node at a time, where multiple rounds of learning modes are used to add multiple new edge nodes.

b. Removing Edge Nodes

In some embodiments, the removal of edge nodes is done gracefully without interrupting stateful services provided by edge cluster. For some of these embodiments, the methods described in Section II.a above for adding new nodes also apply to dynamic resizing of an edge cluster by removing existing nodes, namely, to keep stateful processing of existing flows on their original owner nodes during the node removal process. As mentioned, changes in membership in an edge cluster results in changes in flow to node assignment by consistent hash. Removal of nodes therefore causes existing flows to change owner nodes just as addition of nodes. Some embodiments therefore also anchor existing flows at their original owner nodes during the node removal process.

Figure 18:
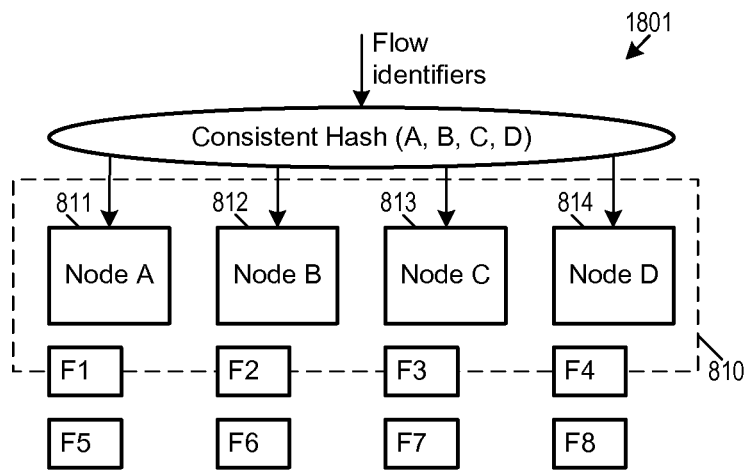
FIG. 18 conceptually illustrates an example node removal operation in which existing flows are anchored to their original owner nodes.
Figure 18:
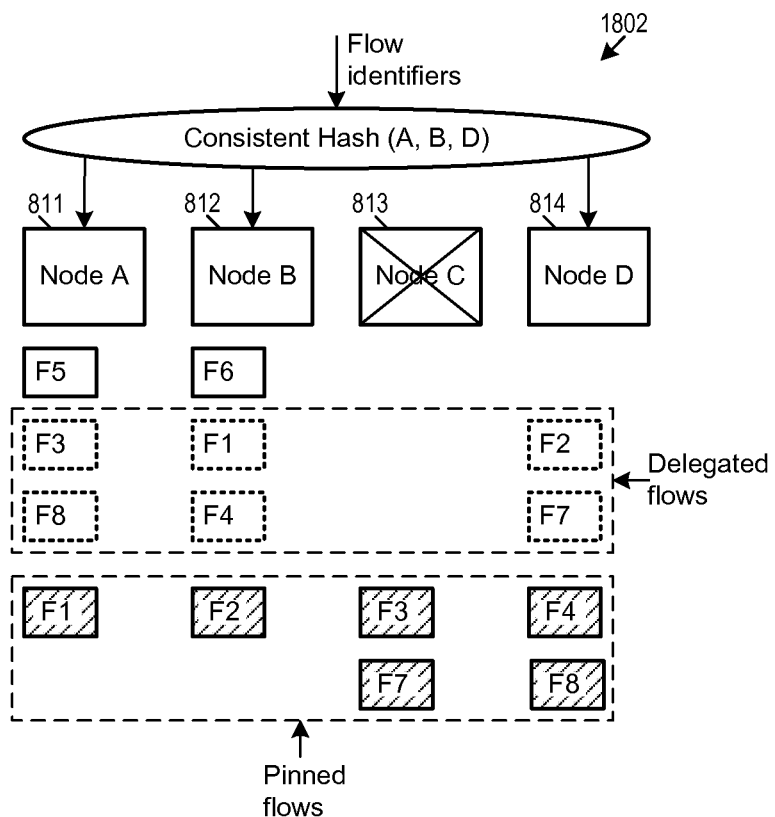

FIG. 18 conceptually illustrates an example node removal operation in which existing flows are anchored to their original owner nodes. As illustrated, the edge cluster 810 originally has nodes 811-814 (nodes A, B, C, and D), and the assignment of owner nodes of flows is based on consistent hash of all four of those nodes. The figure shows the process for removing node C (813) from the cluster 810 in two stages 1801 and 1802.

The first stage 1801 shows the assignment of owner node by consistent hash prior to the removal of node C. As illustrated, prior to removing node C, the consistent hash of flows is over nodes A, B, C, and D in order to identify an owner node from among these four nodes. Under this consistent hash function, flows F1 are F5 are assigned to node A (811), flows F2 and F6 are assigned to node B (812), flows F3 and F7 are assigned to node C (813), and flows F4 and F8 are assigned to node D (814). For this example, flows F1-F8 are assumed to be active, ongoing flows being statefully processed at by nodes A, B, C, and D during stage 1801.

The second stage 1802 shows the removal of new node C and the effect of the removal on the owner node assignment by consistent hash. With the removal of node C, the consistent hash is over only nodes A, B, and D in order to identify an owner node from among these three nodes. Consequently, some or all of the flows F1-F8 are reassigned to different owner nodes. In this example, all flows except F5 and F6 are assigned to different owner nodes by consistent hash. Node A is now the owner node of F3, F5, and F8. Node B is now the owner node of F1, F4, and F6. Node D is now the owner node of F2 and F7. The removed node (node C) is not the owner node of any flow.

Since flows F1-F8 are active, ongoing flows being processed by the edge cluster, these nodes have to be anchored to their original owner node in order for the flows to be statefully processed with the correct state information. Consequently, flow F1 is pinned to node A, flow F2 is pinned to node B, flows F3 and F7 are pinned to node C, and flows F4 and F8 are pinned to node D. The flows that are pinned or anchored to their original owner nodes will be statefully processed there until those flows are complete. This applies to the removed node C as well, which will remain active for the purpose of processing the flows that are pinned to it (F3 and F7) even though node C can no longer be the owner node of any flow.

The new owner nodes of the existing flows, on the other hand, use entries in their indirection tables to delegate those flows to their original owners. Section II.a above describes the delegation of flows by indirection tables and pinned flow tables. In this example, node A delegates flows F3 and F8 to nodes C and D respectively (F5 is process locally at node A), node B delegates flows F1 and F4 to nodes A and D respectively (F6 is process locally at node B), and node D delegates F2 and F7 to nodes B and C respectively.

As mentioned, the removed node does not go offline until it has completed the processing of flows previously assigned to it. This ensures the graceful removal or shutdown of nodes without interrupting the stateful services provided by the edge cluster 810. In some embodiments, an edge cluster is considered to be in a learning mode for the removal of an edge node in the cluster. In some embodiments, the learning mode for the removal of an edge node does not end until the removed node has completed all of its pinned flows and is safe to go off line (so would not interrupt stateful process).

Figure 19:
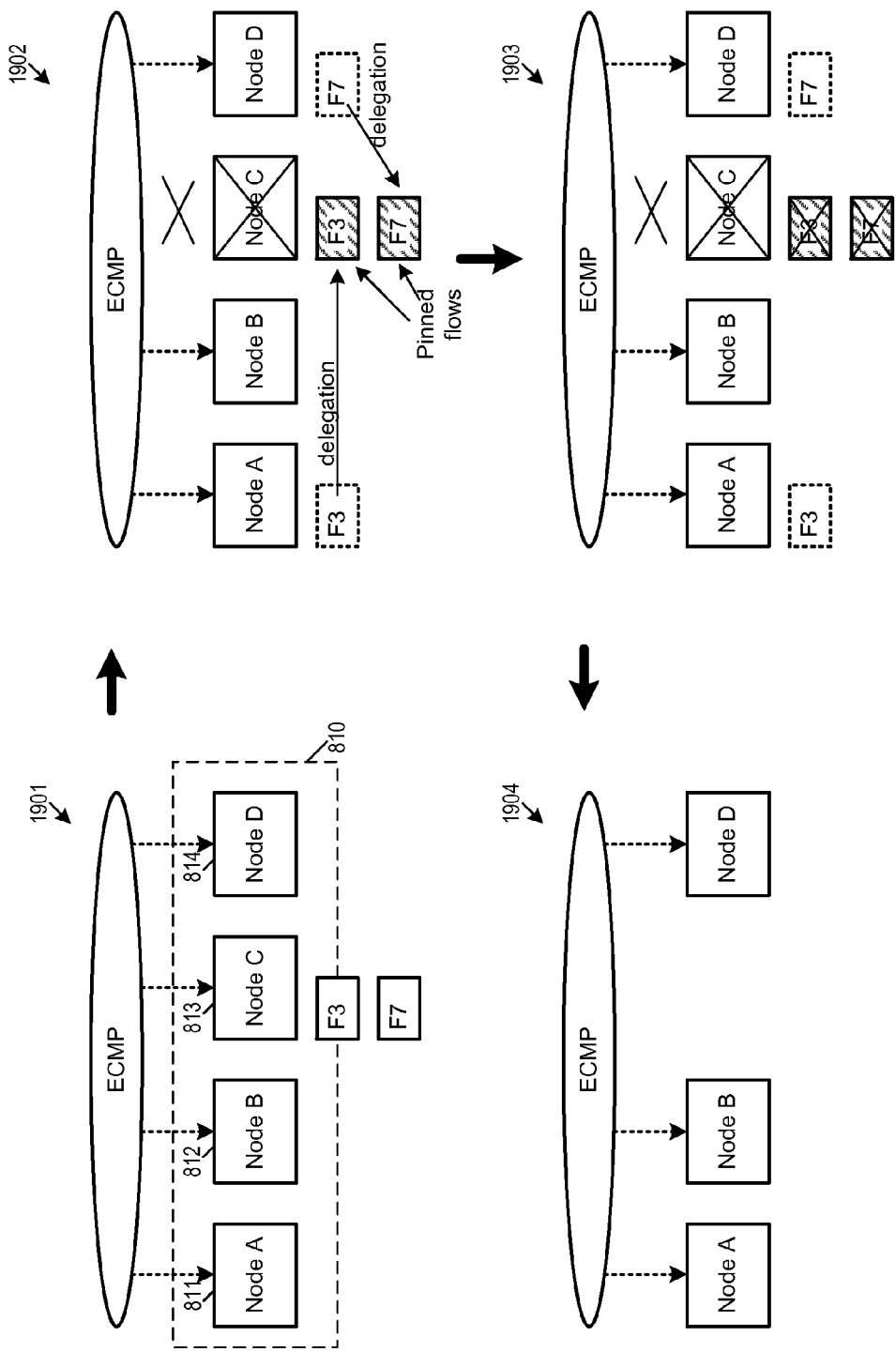
FIG. 19 illustrates the operations the edge cluster during and after the learning mode for the removed node.

In some embodiments, as soon as a node is marked for removal, it ceases to participate in ECMP. FIG. 19 illustrates the operations the edge cluster 810 during and after the learning mode for the removed node 813 (i.e., learning that the node C is to be removed). The removed node 813 ceases to participate in ECMP as soon as it is marked for removal, but the node does not go offline until all flows pinned to the removed node is complete. The figure shows the node removal process in four stages 1901-1904.

The first stage 1901 shows the edge cluster 810 before the removal of node C (813). As shown, the edge cluster 810 has four nodes 811-814 (nodes A, B, C, and D) that are participating in ECMP process and providing stateful services. As illustrated, the node 813 is the owner node of F3 and F7 by consistent hash and is maintaining state information for these flows.

The second stage 1902 shows the edge cluster 810 immediately after node C (813) is marked for removal. As soon as node C is marked for removal, the ECMP process ceases distributing packets to it. Furthermore, the consistent hash no longer include node C in its hash function, and node A (811) becomes the new owner node of flow F3 and node D becomes the new owner node of F7. However, F3 and F7 are also pinned or anchored to node C (813) because they are actively processed by node C and their state information are kept by node C. Node A has an entry in its indirection table (not illustrated) for delegating packets of flow F3 to node C, and node D has an entry in its indirection table (not illustrated) for delegating packets of flow F7 to node C.

The third stage 803 shows the completion of the pinned flows (i.e., F3 and F7). As these flows are complete, the removed node C (813) can go off line. The final stage 804 shows the cluster 810 at a new steady state, with node C gracefully removed without interruption to any stateful services.

III. Related Flows

Delegation of flow (or transfer of state information) is necessary when the requisite state information is not in the owner node of the flow by consistent hash. As described above in Section II, this is so when there is a change in membership in the edge cluster (e.g., addition or removal of nodes) that changes owner node assignments. In some embodiments, delegation of flow is also necessary when state information of a first flow residing on a first node is the requisite state information of a second flow assigned to a second node. In some embodiments, the first flow and the second flow are related flows that are assigned to different owner nodes by consistent hash. In some embodiments, this occurs when a control flow and a data flow of a same process are assigned to different owner nodes because they have different flow identifiers. In order to ensure that the related flows are operating off a same set of state information being maintained on a same node, some embodiments use flow delegation to force related flows to be (statefully) processed by the same node, even if the two related flows are hashed to different owner nodes by consistent hash.

There are protocols such as FTP, SIP, or RTSP that need ALG support to work through firewall and NAT functions. These protocols use multiple flows and the same node should generally process the related flows, as they often share state. It is then necessary for the data-plane of node to look into the application protocols to determine the related flows. In a clustered service, the related flows used in a protocol have to be handled consistently and efficiently by the same node. For FTP (file transfer protocol), the control flow is established first in some embodiments. The information regarding the data flow is communicated via the control flow. Therefore, the control flow has to be monitored to learn the data flow information (i.e., PORT or PASV commands on the control flow).

Figure 20:
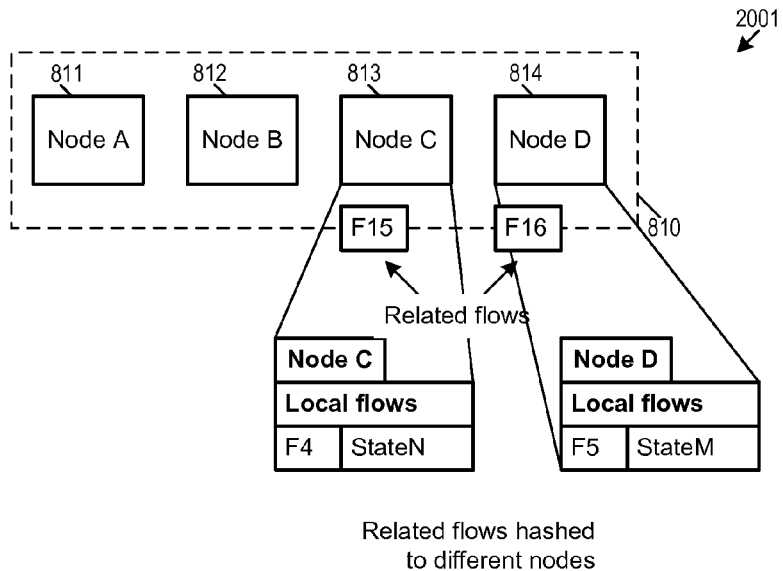
FIG. 20 illustrates using flow delegation to process related flows at the same node.
Figure 20:
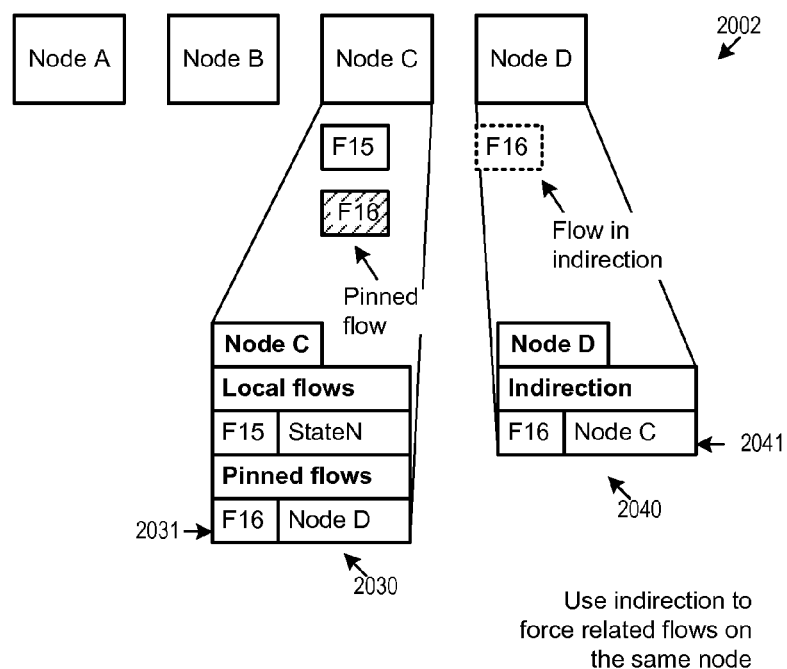

FIG. 20 illustrates using flow delegation to process related flows at the same node. As illustrated, the node 813 (node C) and the node 814 (node D) of the cluster 810 are assigned flows F15 and F16 respectively by consistent hash. The flows F15 and F16 are related flows (e.g., a control flow and a data flow of a same transport layer exchange). The figure illustrates the related flow delegation in the cluster 810 in two stages 2001 and 2002.

The first stage 2001 shows the original assignments of F15 and F16 by consistent hash. Node C as the owner node of F15 would have the state information of flow F15 while Node D as the owner node of F16 would have the state information of flow F16. However, F15 and F16 are related flows. In some embodiments, related flows are flows that share the same set of state information. In some embodiments, related flows are flows that have to be processed in sequence. For example, the stateful service of F16 requires the final state information of the flow F15, and F16 is a flow that is subsequent to F15 such that packets of the flow F16 appears only after the flow F15 has completed.

The second stage 2002 shows the delegation flows for processing packets of related flows. As illustrated, the flow F15 is still processed by its owner node (node C), but packets of the flow F16 is delegated by the node D (the owner node of F16) to node C. Node D forwards packets of F16 to the node C based on an entry 2041 of an indirection table 2040, the entry corresponding to the flow F16 that is pointed at node C. Node C accepts the delegated packet of flow F16 based on an entry 2031 of a pinned flow table 2030. In other words, the flow F16 has become an indirect/delegated flow at the node D, even though node D is the owner node of F16. The flow F16 has also become a flow pinned/anchored to node C, even though node C is never the owner node of F16. Consequently, both flows F15 and F16 are statefully processed by the same node (node C).

Figure 21:
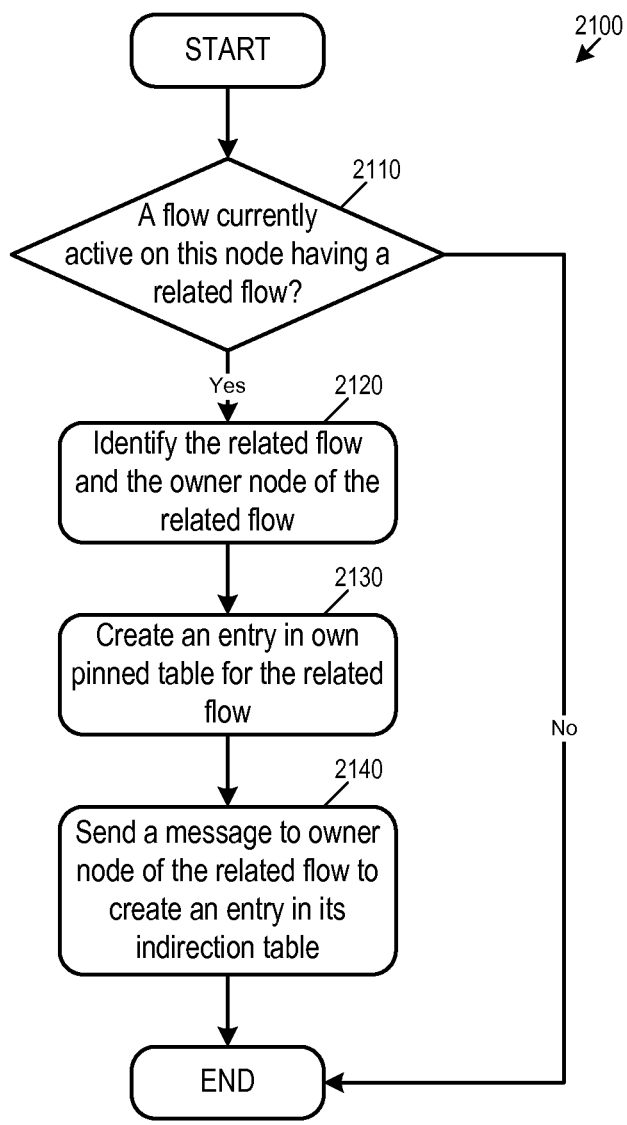
FIG. 21 conceptually illustrates a process for establishing flow delegation for statefully processing related flows in a cluster of edge nodes.

For some embodiments, FIG. 21 conceptually illustrates a process 2100 for establishing flow delegation for statefully processing related flows in a cluster of edge nodes. The process is performed by a node in an edge cluster in some embodiments. The process starts by determining (at 2110) whether a flow currently active on this edge node (the edge node running the process 2100) has a related flow. For example, a control flow of FTP has a related data flow, thus an edge node processing the control flow of an FTP would know that there is an upcoming related data flow. If none of the flows actively running on this edge node has a related flow, the process 2100 ends. If there is at least one flow running in this edge node that has a related flow, the process identifies (at 2120) the related flow and the owner node of the related flow. In some embodiments, the edge node identifies related flows based on information furnish by a network manager or other edge nodes via control plane messages.

Next, the process creates (at 2130) an entry in own pinned table for the related flow and sends (at 2140) a message to the owner node of the related flow to create an entry in its indirection table. In the example of FIG. 20, node C is the edge node that is processing the flow F15, which has a related flow F16 whose owner node is node D. Node C therefore created a pinned flow entry (2031) for the flow F16 in its pinned flow table (2030). Node C also sends a message to node D so node D would create an indirection entry (2041) for the flow F16 in its indirection table (2040).

After sending the message to set up the indirection, the process 2100 ends, and the edge nodes in the cluster proceeds to processing incoming packets for the related flows based on the indirection tables and pinned flow tables.

IV. Address Translation

In some embodiments, the stateful service provide by the edge cluster includes network address translation (NAT). NAT is a method of modifying network address information in Internet Protocol (IP) datagram packet headers while they are in transit across a traffic routing device for the purpose of remapping one IP address space into another. In case of DNAT, the destination address (e.g., often VIP address/port) is replaced with southbound addresses and ports. This creates two flows associated with a DNAT service: one using the original destination address, and one using the translated address. These two flows are in reality the same flow, and yet they have different flow identifiers and will be hashed to different edge nodes. In other words, each flow has two owner nodes, one identified by the flow's original destination addresses, the other identified by the flow's translated addresses.

In some embodiments, the owner node of a flow according to the original address pushes an indirection message to the owner node of the flow according to the translated DNAT addresses in order to keep packets of the flow on the same node. As result, the owner node identified by translated DNAT address has an indirection table entry for delegating packets of the flow to the owner node identified by the original address, which has a pinned flow table entry to accept and process packets with flow identifiers based on the DNAT address. (Conversely, in some other embodiments, the owner node identified by the DNAT address pushes an indirection message to the owner node identified by the original address so the owner node identified by the original address delegates packets of the flow to the owner node identified by the DNAT address.) In other words, the flow as identified by its original address and the flow as identified by its DNAT address are processed as related flows by the edge cluster in some embodiments.

Figure 22A:
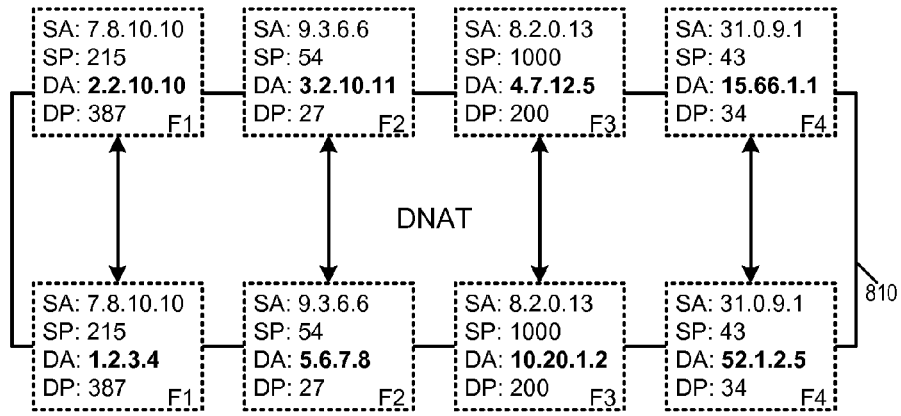
FIG. 22a conceptually illustrates example DNAT services performed by an edge cluster.

FIG. 22*a* conceptually illustrates example DNAT services performed by the edge cluster 810. The figure illustrates four example flows F1-F4 having different flow identifiers. The DNAT performed by the edge cluster 810 translates the destination addresses of southbound flows from their original addresses to DNAT addresses. For example, the edge cluster 810 translates the destination address of southbound F1 from "2.2.10.10" to "1.2.3.4", and destination address of southbound F2 from "3.2.10.11" to "5.6.7.8", etc.

The DNAT also performs inverse DNAT service on northbound traffic. The inverse DNAT service translates the DNAT addresses of the northbound flows back to their original addresses. For example, the edge cluster 810 translates the destination address of northbound F1 from "1.2.3.4" to "2.2.10.10", the destination address of northbound F2 from "5.6.7.8" to "3.2.10.11", etc. Although the northbound flows and the southbound flows are the same flows, they have different flow identifiers and will be hashed to different edge node within the cluster 810 by consistent hash.

Figure 22B:
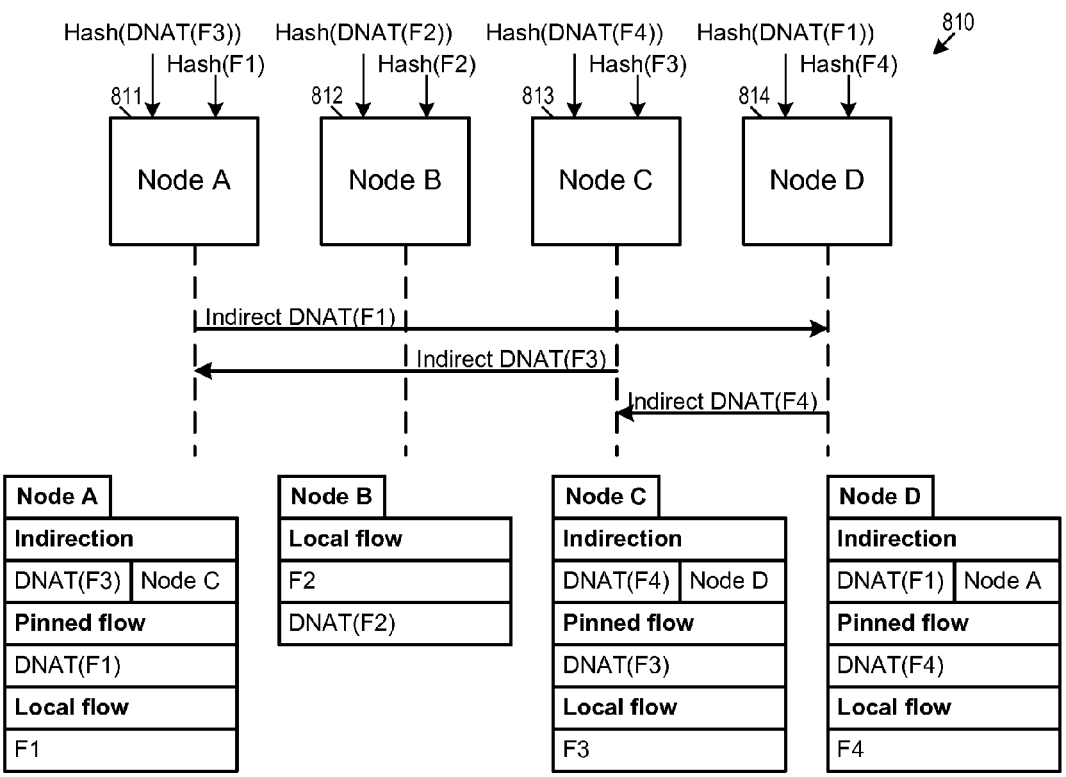
FIG. 22b illustrates using flow delegation to provide stateful DNAT service by an edge cluster.

FIG. 22*b* illustrates how the edge cluster 810 assigns owner nodes when the nodes in the edge cluster 810 are performing DNAT service. As illustrated, for southbound traffic in which flow identifiers are based on original addresses, flows F1-F4 are hashed to nodes A, B, C, and D (the nodes 811-814) respectively. However, for northbound traffic in which flow identifiers are based on translated DNAT addresses (i.e., DNAT(F1), DNAT(F2), DNAT(F3), and DNAT(F4)), the flow F1 is hashed to node D, the flow F2 is hashed to node B, the flow F3 is hashed to node A, and he flow F4 is hashed to node C. In the figure, "Hash(F1)" denotes hashing of F1 based on flow identifiers having original destination address, while "Hash(DNAT(F1))" denotes hashing of F1 based on flow identifiers having translated destination address.

FIG. 22*b* also illustrates using flow delegation to provide stateful DNAT service by the edge cluster 810. As illustrated, node A sends a indirection message for DNAT(F1) to node D, informing node D to delegate packets with flow identifier based on DNAT(F1) to node A. Node C sends a indirection message for DNAT(F3) to node A, informing node A to delegate packets with flow identifier based on DNAT(F3) to node C. Node D sends a indirection message for DNAT(F4) to node C, informing node C to delegate packets with flow identifier based on DNAT(F4) to node D. F2 and DNAT(F2) are both hashed to node B so node B does not send out indirection messages.

Consequently, node A receives delegated packets with DNAT(F1) so node A can statefully process all packets of the flow F1, both northbound and southbound. Likewise, node C receives delegated packets with DNAT(F3) to statefully process all packets of flow F3 and node D receives delegated packets with DNAT(F4) to statefully process all packets of flow F4. (Node B already receives packets of both F2 and DNAT(F2) in this example).

Figure 23A:
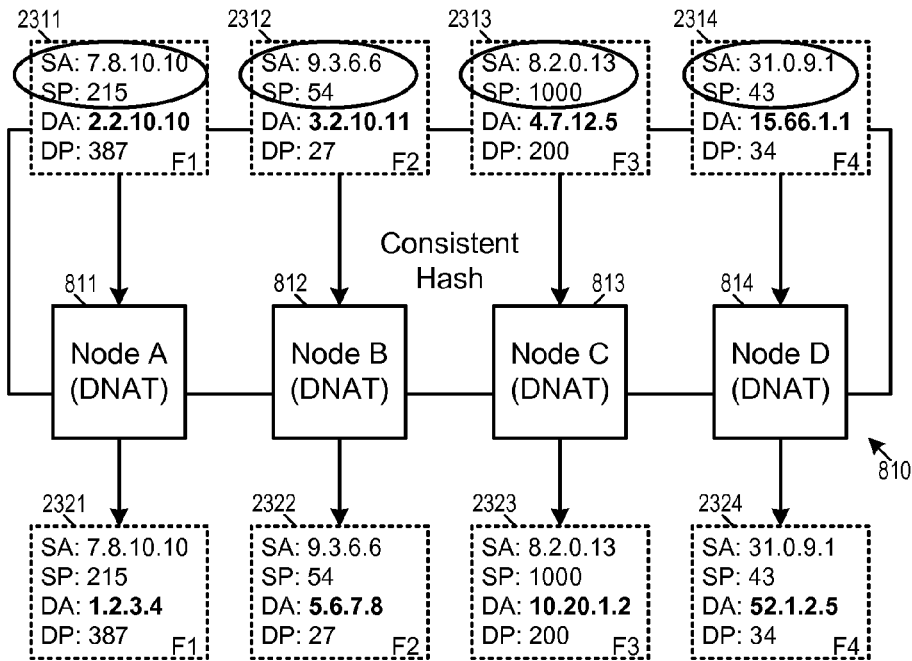
FIGS. 23a-b illustrates an edge cluster that does not use destination address field for node assignment when performing DNAT.
Figure 23B:
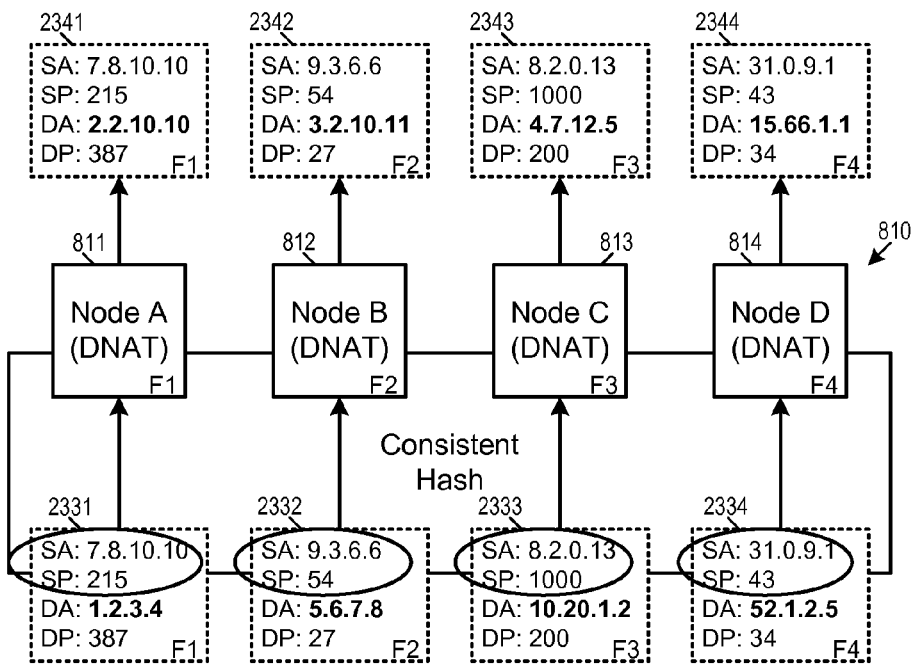

In some other embodiments, instead of flow delegation, an edge cluster performing DNAT determines owner nodes without using the destination addresses, which may be translated. In other words, the cluster applies consistent hash only to fields that are unaffected by DNAT (e.g., source address fields, source port fields, protocol fields). FIGS. 23*a-b* illustrates an edge cluster that does not use destination address field for node assignment when performing DNAT.

FIG. 23*a* illustrates southbound traffic in which destination addresses is DNAT'ed from their original addresses to that translated addresses. Southbound packets 2311 are packets of the flow F1, packets 2312 are packets of the flow F2, packets 2313 are packets of the flow F3, packets 2314 are packets of the flow F4. The packets 2311-2314 are respectively hashed to nodes 811-814 of the edge cluster 810. The hash is based only on the source address and source port of the packets. The destination addresses of those packets are not used when applying the consistent hash to determine the owner node of the flows. The nodes in the edge cluster 810 perform DNAT service on those packets to produced packets 2321-2324. These packets have the same original source addresses, but their destination addresses are translated addresses from DNAT.

FIG. 23b illustrates northbound traffic in which destination addresses went from their translated addresses back to their original addresses. Northbound packets 2331-2334 are packets of the flows F1-F4 respectively. The destination addresses of these northbound packets are addresses translated by DNAT, but their source addresses and ports are original addresses unaffected by DNAT. The packets 2331-2334 are hashed to nodes A, B, C, and D based on those unaffected source port and addresses. Consequently, packets of flows F1-F4 are still processed by nodes A, B, C, and D, respectively, and that DNAT has no effect on owner node assignment. Each flow is thus statefully processed by a same node, regardless of whether the destination address field is translated or original.

In case of SNAT, edge nodes in the cluster changes the source address of outgoing southbound packets. The SNAT of a packet occurs after routing by the owner node of its flow. In some embodiments, each node in the edge cluster uses its own unique SNAT address when performing address translation. The return northbound traffic is forwarded to the same owner node based on those unique SNAT addresses in the source address field. The owner node then applies the inverse NAT while maintaining state of the stateful SNAT process. If there is a firewall service, the flow state is identified by the tuple after SNAT reverse mapping.

Figure 24A:
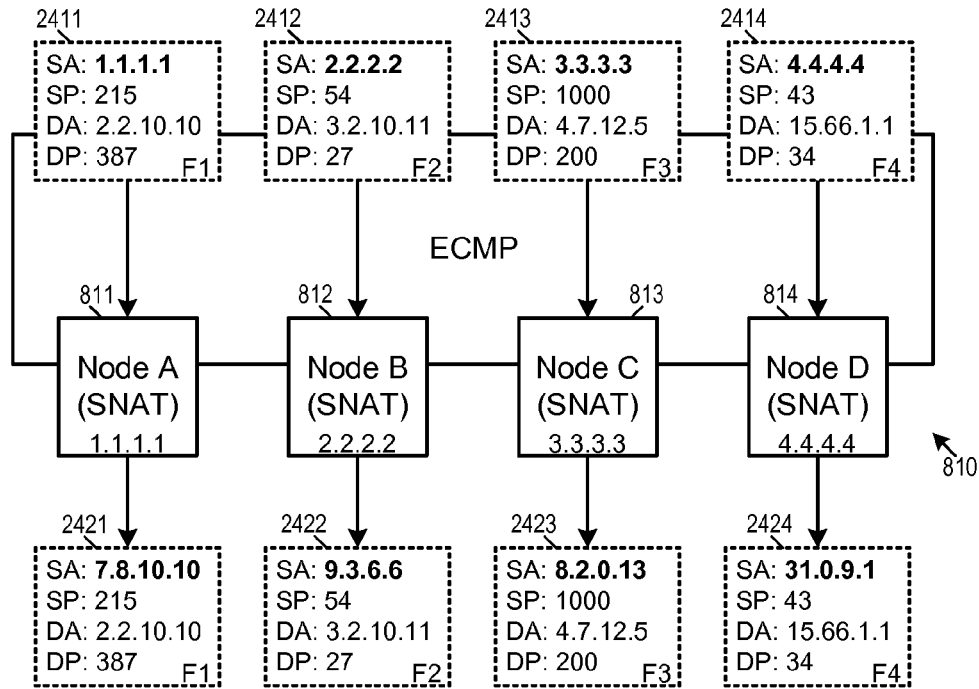
FIGS. 24a-b illustrates how nodes in an edge cluster provide stateful SNAT services.
Figure 24B:
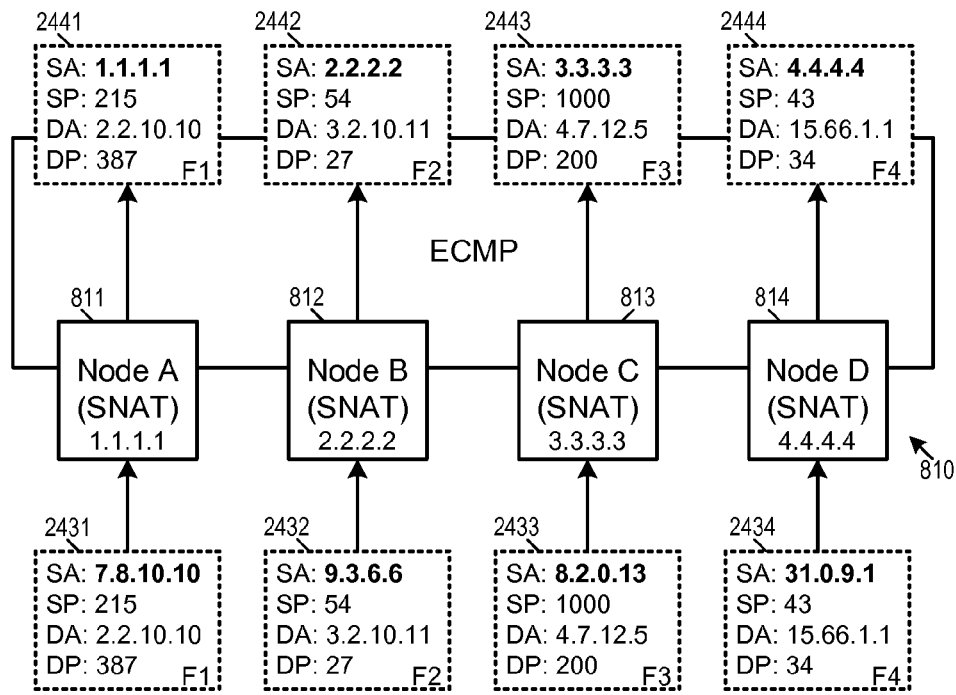

FIGS. 24a-b illustrates how nodes in an edge cluster provide stateful SNAT services for some embodiments. As illustrated, the edge nodes 811-814 (nodes A, B, C, and D) of the cluster 810 are providing SNAT services, where each node has its own unique source address when performing SNAT. Specifically, node A's SNAT address is "1.1.1.1", node B's SNAT address is "2.2.2.2", node C's SNAT address is "3.3.3.3", and node D's SNAT address is "4.4.4.4".

FIG. 24a shows southbound traffic packets 2411-2414 that respectively belong to flows F1, F2, F3, and F4. The packets of flows F1-F4 are hashed into nodes A, B, C, and D according to consistent hash of the packets' flow identifiers. Node A in turn performs SNAT on packets belonging to F1 and translates the source address to its own SNAT address "1.1.1.1". Similarly, node B performs SNAT on F2 packets and translates the source address to its own "2.2.2.2", node C performs SNAT on F3 packets and translates the source address to its own "3.3.3.3", and node D performs SNAT on F4 packets and translates the source address to its own "4.4.4.4".

FIG. 24b shows the returning northbound traffic to the cluster 2410. As illustrated, each packet in the northbound traffic find its way back to the edge node that performs the SNAT based on the unique SNAT address in the source address field. Specifically, northbound packets 2431 of F1 go to node A based on source address "1.1.1.1", northbound packets 2432 of F2 go to node B based on source address "2.2.2.2", northbound packets 2433 of F3 go to node C based on source address "3.3.3.3", and northbound packets 2434 of F4 go to node D based on source address "4.4.4.4". Each node in turn performs inverse SNAT on the northbound packets by identifying the flow of the packets and translating the node's unique SNAT address back to the flow's original source address. Packets of flows F1-F4 are therefore always processed by nodes A, B, C, and D, respectively, and SNAT has no effect on owner node assignment. Each flow is statefully processed by a same node, regardless of whether the source address field is translated or original.

V. Virtual Machines as Edge Nodes

Figure 25:
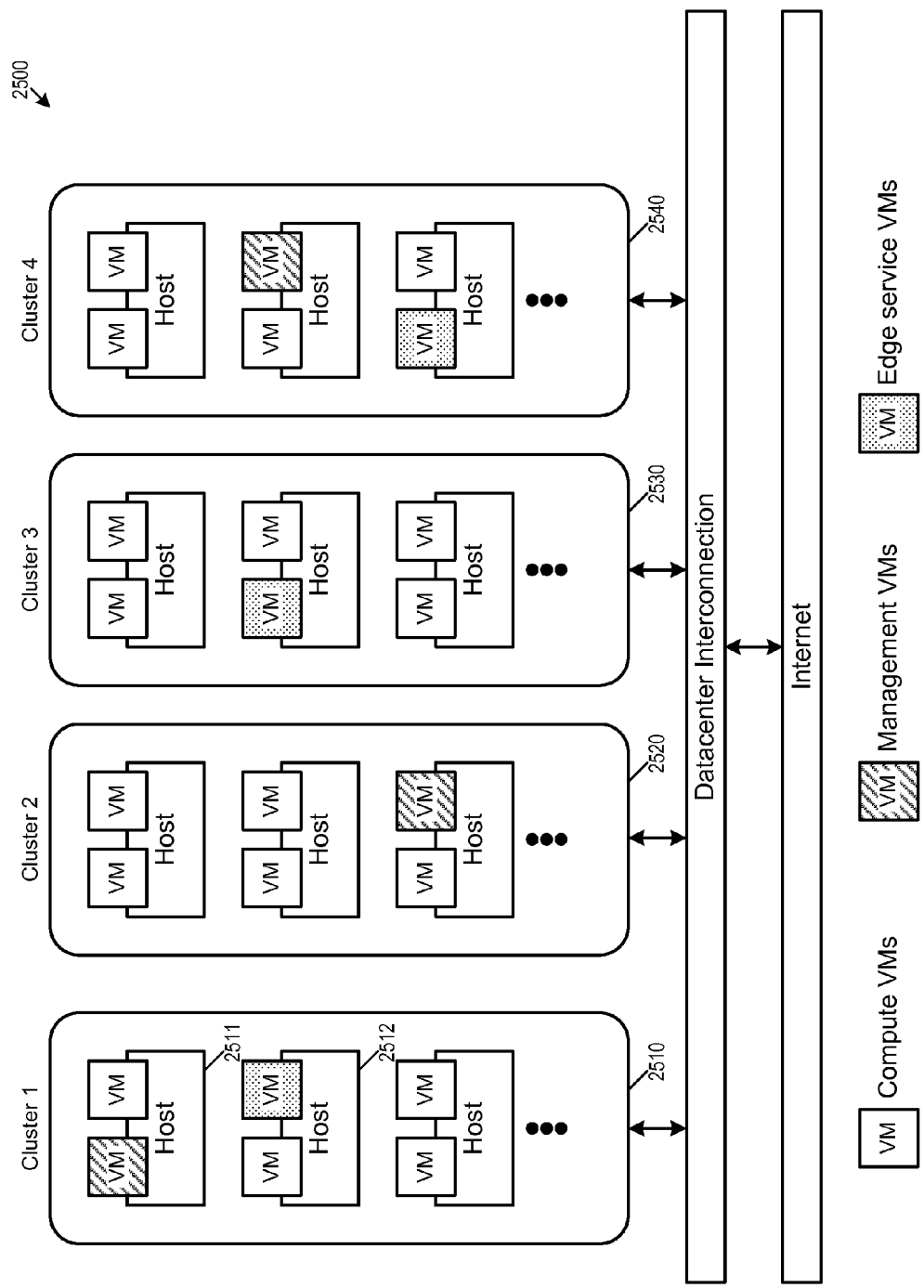
FIG. 25 illustrates a data center having host machines that are grouped into clusters or sections.

As mentioned, in some embodiments, some or all of the edge nodes in edge clusters are implemented as virtual machines hosted by computing devices running virtualization software or hypervisors. In some embodiment, these computing devices (or host machines) are situated in data centers that house many such host machines. FIG. 25 illustrates a data center 2500 having host machines that are grouped into clusters or sections (clusters 2510, 2520, 2530, and 2540). Each cluster includes one or more host machines that are hosting virtual machines. Some of the virtual machines are compute VMs that perform computing tasks for clients or tenants of the data center. Some of the virtual machines are edge VMs that provide edge services such as NAT or firewall. Some of the virtual machines are management VMs that provide control to other VMs/host machines in the data center. Some host machines hosts different types of VMs. For example the host machine 2511 hosts a compute VM and a management VM, and the host machine 2512 hosts a compute VM and an edge VM.

In some embodiments, each cluster or section of VMs has its own collection of edge service VMs that serve as its edge cluster, the edge cluster providing stateful services in manners described in Sections I-IV above.

Figure 26:
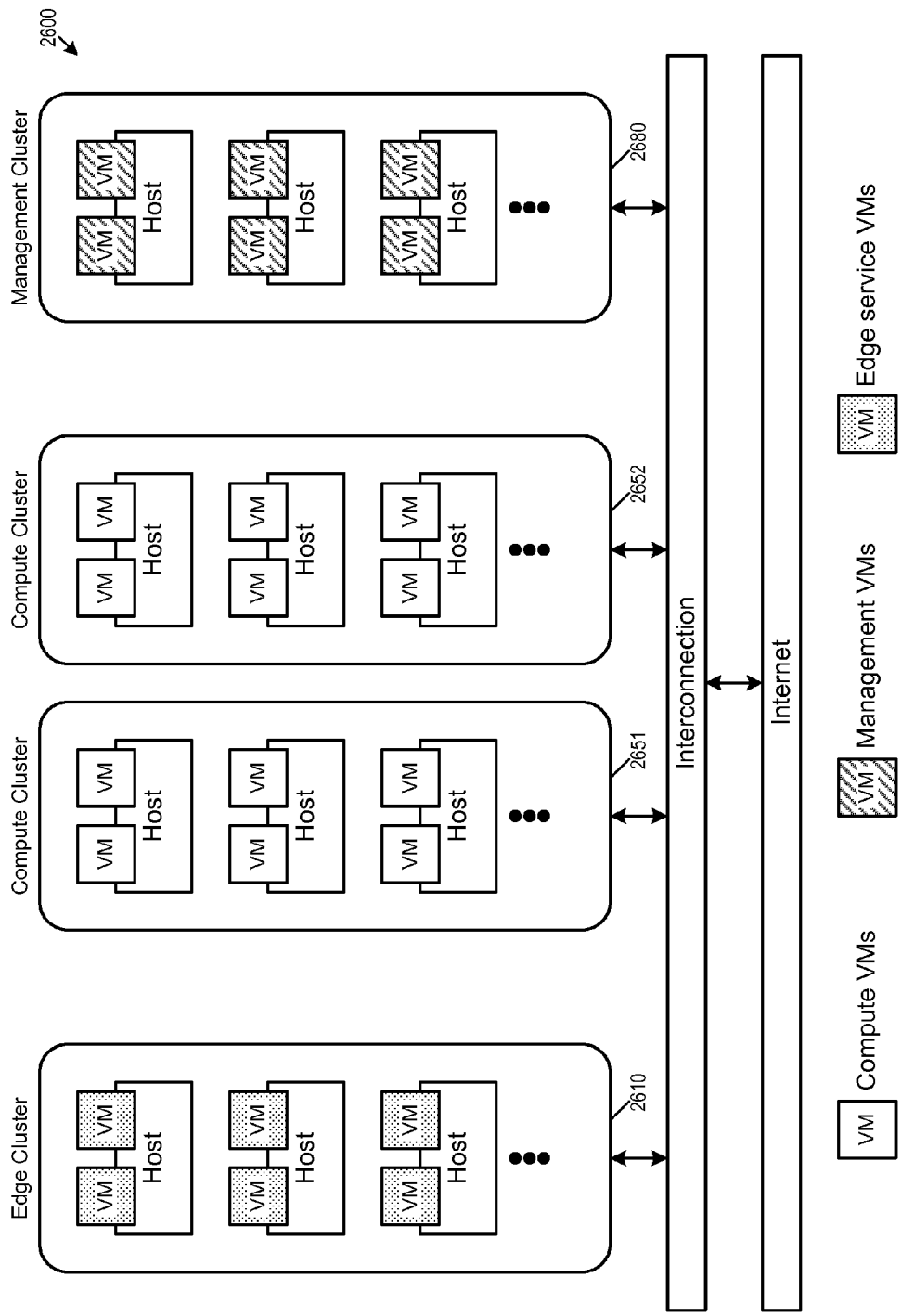
FIG. 26 illustrates a data center that includes a cluster or section of host machines that hosts mostly edge service VMs that serve as edge nodes for compute VMs in other clusters.

In some embodiments, a data center has specialized clusters or sections such as compute clusters or management clusters. In some embodiments, a data center includes a cluster or section of host machines that hosts mostly edge service VMs that serve as edge nodes for compute VMs in other clusters. FIG. 26 illustrates a data center 2600 that includes an edge cluster 2610, several compute clusters 2651-2652, and a management cluster 2680. The edge cluster 2610 hosts VMs that serve as edge nodes for VMs in the compute clusters 2651-2652. The VMs in the management cluster 2680 perform control and management functions.

Figure 27:
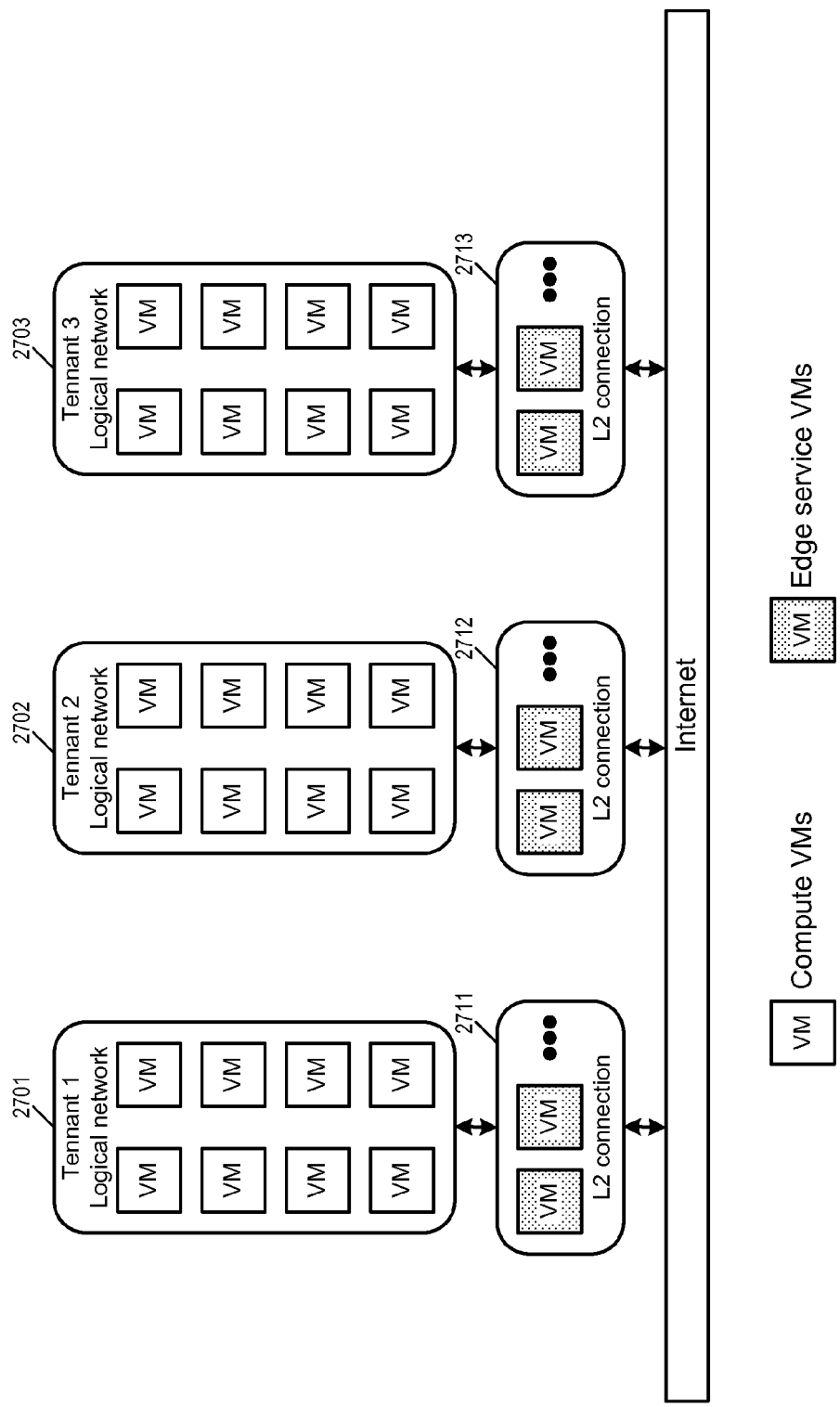
FIG. 27 illustrates logical networks for different tenants that are each served by a group of edge service VMs serving as the logical network's edge service cluster.

Regardless of the physical topology and the actual physical placement of the VMs, in some embodiments, the compute VMs are logically organized into different logical networks for different tenants, and the edge service VMs are logically organized into edge service clusters for the different logical networks. FIG. 27 illustrates logical networks for different tenants that are each served by a group of edge service VMs serving as the logical network's edge service cluster. The figure illustrates logical networks 2701-2703 for the tenants 1, 2, and 3 respectively. The logical network 2701 uses an edge service cluster 2711, the logical network 2702 uses an edge service cluster 2712, and the logical network 2703 uses an edge service cluster 2713. Each of the edge service clusters includes a number of edge service VMs as edge nodes. In some embodiments, the edge nodes of an edge cluster are in a same L2 segment such that the packet forwarding and the flow delegation operations of the edge cluster are conducted by L2 level traffic (i.e., the edge nodes in a same edge cluster communicates are addressable by each other by L2 MAC address).

VI. Computing Device

Figure 28:
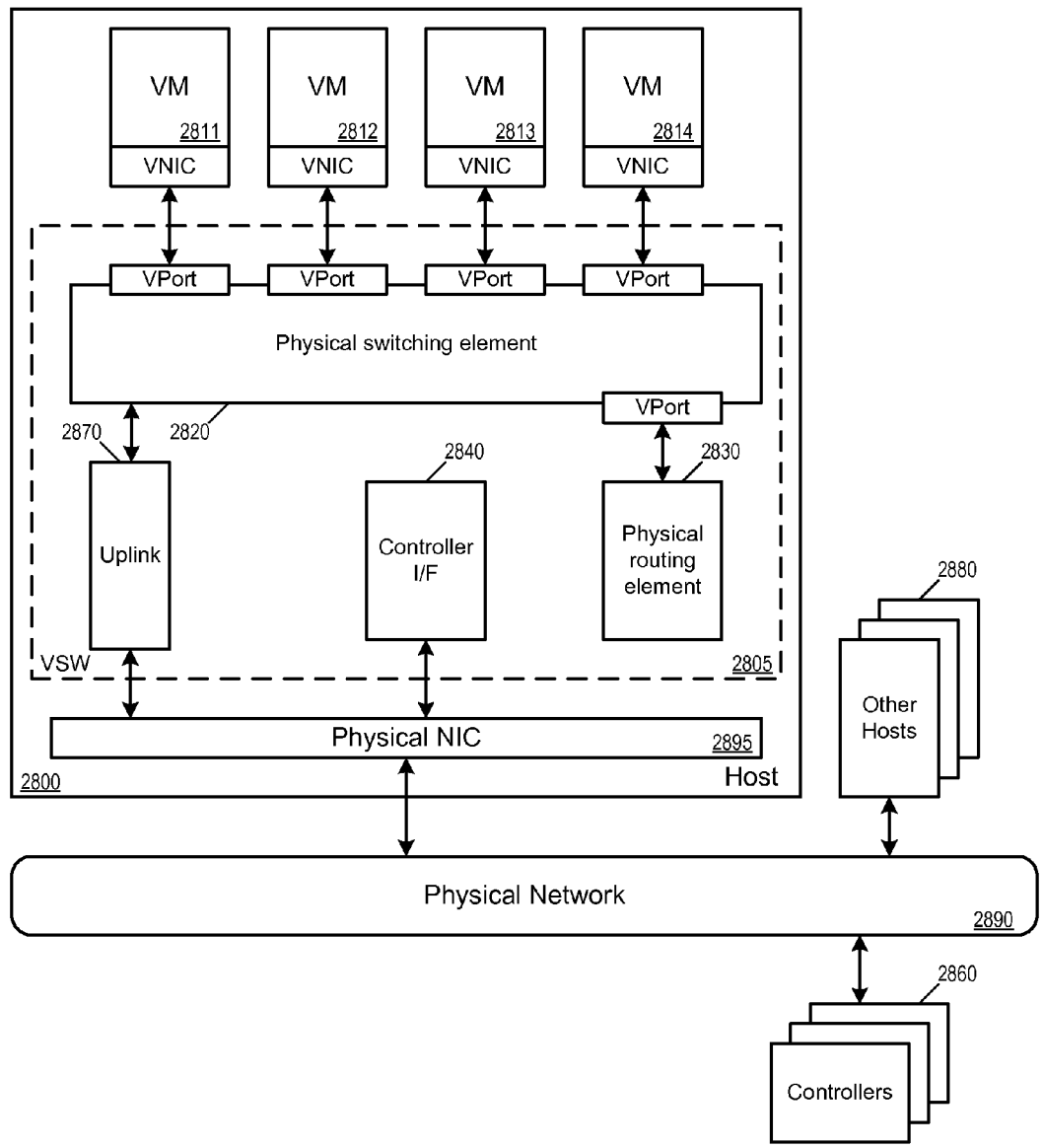
FIG. 28 illustrates an example host machine that is operating virtualization software.

As mentioned earlier, some embodiments of the invention are implemented by virtualization software or hypervisors running on computing devices serving as host machines. For some embodiments, FIG. 28 illustrates an example host machine 2800 that is operating virtualization software 2805. The virtualization software 2805 allows the host machine to host virtual machines 2811-2814 as well as connecting the virtual machines to a physical network 2890. This physical network 2890 may span one or more data centers and include various physical switches and routers.

As illustrated, the host machine 2800 has access to the physical network 2890 through a physical NIC (PNIC) 2895. The virtualization software 2805 serves as the interface between the hosted VMs 2811-2814 and the physical NIC 2895 (as well as other physical resources, such as processors and memory). Each of the VMs includes a virtual NIC (VNIC) for accessing the network through the virtualization software 2805. Each VNIC in a VM is responsible for exchanging packets between the VM and the virtualization software 2805. In some embodiments, the VNICs are software abstractions of physical NICs implemented by virtual NIC emulators.

The virtualization software 2805 manages the operations of the VMs 2811-2814, and includes several components for managing the access of the VMs to the physical network (by implementing the logical networks to which the VMs connect, in some embodiments). As illustrated, the virtualization software 2805 includes a physical switching element 2820, a physical routing element 2830, a controller interface 2840, and an uplink module 2870.

The controller interface 2840 receives control plane messages from a controller or a cluster of controllers 2860. In some embodiments, these control plane message includes configuration data for configuring the various components of the virtualization software and/or the virtual machines (such as the physical switching element 2820 and the physical routing element 2830). In some embodiments, the control plane messages also include messages for dynamically resizing an edge cluster from a central network manager or a local network manager.

The physical switching element 2820 (or managed physical switching element, MPSE) delivers network data to and from the physical NIC 2895, which interfaces the physical network 2890. The physical switching element also includes a number of virtual ports (vPorts) that communicatively interconnects the physical NIC with the VMs 2811-2814, the physical routing element 2830 and the controller interface 2840. Each virtual port is associated with a unique L2 MAC address, in some embodiments. The physical switching element performs L2 link layer packet forwarding between any two network elements that are connected to its virtual ports. The physical switching element also performs L2 link layer packet forwarding between any network element connected to any one of its virtual ports and a reachable L2 network element on the physical network 2890 (e.g., another VM running on another host).

The physical routing element 2830 (or managed physical routing element, MPRE) performs L3 routing (e.g., by performing L3 IP address to L2 MAC address resolution) on data packets received from a virtual port on the physical switching element 2820. In some embodiments, the virtual port that the physical routing element 2830 is attached to is a sink port. Each routed data packet is then sent back to the physical switching element 2820 to be forwarded to its destination according to the resolved L2 MAC address. This destination can be another VM connected to a virtual port on the physical switching element 2820, or a reachable L2 network element on the physical network 2890 (e.g., another VM running on another host, a physical non-virtualized machine, etc.).

The uplink module 2870 relays data between the physical switching element 2820 and the physical NIC 2895. In some embodiments, the uplink module 2870 allows the host machine 2800 to serve as a tunnel endpoint for encapsulation overlay networks such as VXLAN and VLANs. VXLAN is an overlay network encapsulation protocol. An overlay network created by VXLAN encapsulation is sometimes referred to as a VXLAN network, or simply VXLAN. When a VM on the host 2800 sends a data packet (e.g., an ethernet frame) to another VM in the same VXLAN network but on a different host, the uplink module 2870 encapsulates the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The uplink module 2870 also decapsulates incoming VXLAN packets and forwards only the original inner data packet to the destination VM.

Figure 29:
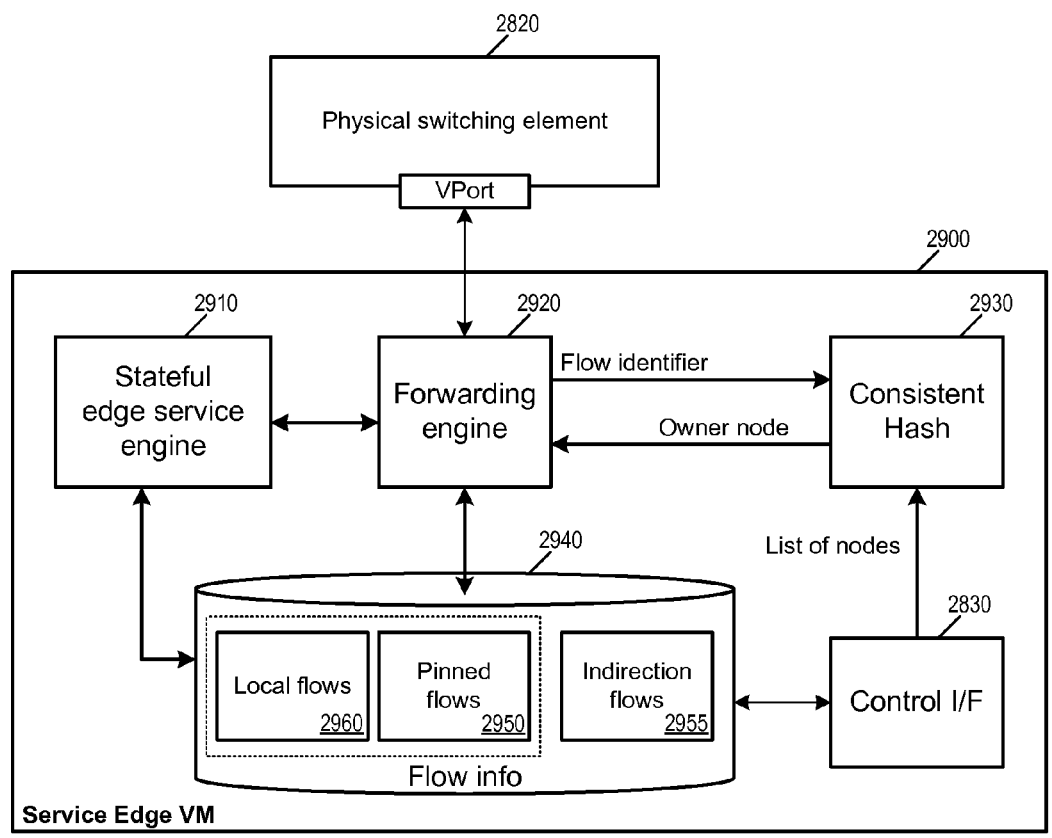
FIG. 29 illustrates an edge service VM that is running in a host machine.

FIG. 29 illustrates an edge service VM 2900 that is running in the host machine 2800 (e.g., as one of the VMs 2811-2814). The edge VM 2900 exchange data plane packets with the physical switching element 2820 as well as control plane messages with the controller interface 2840. As illustrated, the edge service VM 2900 includes stateful service engine 2910, a packet forwarding engine 2920, a consistent hash engine 2930, and a flow information storage 2940.

The stateful edge service engine 2910 is for providing the stateful edge services (e.g., firewall, NAT) based on the incoming packets from the physical switching packet and on the state of the flow that is stored in the flow information storage 2940. In some embodiments, the stateful service engine 2910 provides the necessary data to the packets to the forwarding engine 2920.

The forwarding engine 2920 receives and forwards network packet via the physical switching element 2820. In some embodiments, the forwarding engine makes its forwarding decisions or alters packet based on information provided by the stateful edge service engine 2910, information such as address translation or firewall decisions. In some embodiments, the forwarding engine 2920 sends flow identifier of each incoming packet to the consistent hash engine 2930 in order to ascertain its owner node. The forwarding engine 2920 also uses information in the flow information storage 2940 to decide whether or where to forward the packet. In some embodiments, the forwarding engine 2920 performs the processes such as 700, 900, 1500, 1600, and 1700.

The consistent hash engine 2930 performs the consistent hash function on the flow identifiers of packets in order to identify their owner nodes. In some embodiments, the hash result is also based on the membership (e.g., the number of edge nodes in the cluster) of the edge cluster, which is provided by network manager via the controller interface 2830.

The flow information storage 2940 in some embodiments stores tables needed for implementing flow delegation such as a pinned flow table 2950 and an indirection table 2955. In some embodiments, the flow information stage 2940 also includes a local flows table 2960, which maintains the state information of the flows that the edge VM is handling. In some embodiments, the pinned flow table 2950 and the local flow table 2960 are implemented as one table that keeps track of all flows that the edge VM 2900 is handling. The stored states are provided to the stateful service engine 2910 for performing stateful services.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

VII. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 30:
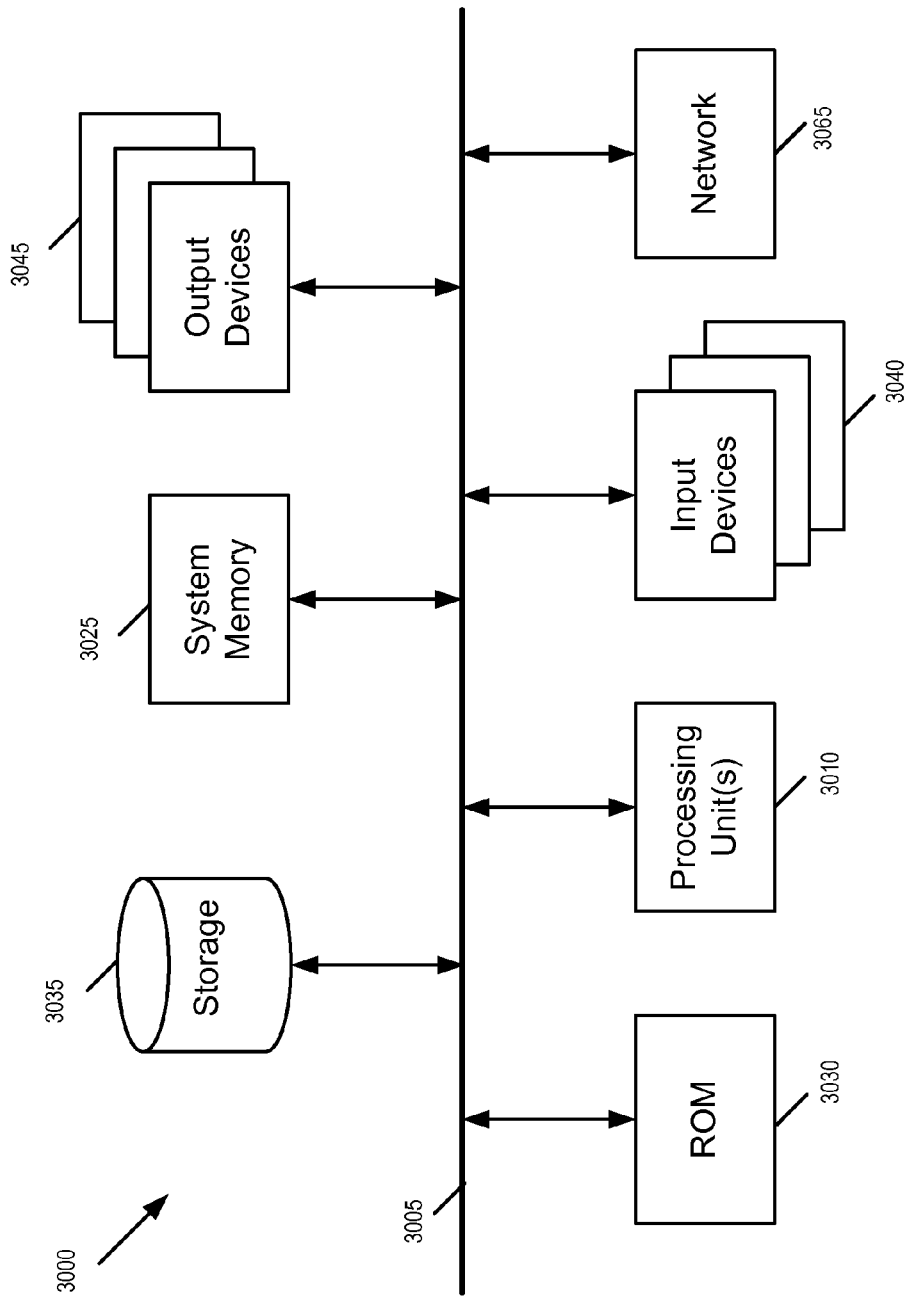
FIG. 30 conceptually illustrates an electronic system with which some embodiments of the invention are implemented.

FIG. 30 conceptually illustrates an electronic system 3000 with which some embodiments of the invention are implemented. The electronic system 3000 can be used to execute any of the control, virtualization, or operating system applications described above. The electronic system 3000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 3000 includes a bus 3005, processing unit(s) 3010, a system memory 3025, a read-only memory 3030, a permanent storage device 3035, input devices 3040, and output devices 3045.

The bus 3005 collectively represents all system, peripheral, and chipset buses that communicatively connect the numerous internal devices of the electronic system 3000. For instance, the bus 3005 communicatively connects the processing unit(s) 3010 with the read-only memory 3030, the system memory 3025, and the permanent storage device 3035.

From these various memory units, the processing unit(s) 3010 retrieves instructions to execute and data to process in order to execute the processes of the invention. The processing unit(s) may be a single processor or a multi-core processor in different embodiments.

The read-only-memory (ROM) 3030 stores static data and instructions that are needed by the processing unit(s) 3010 and other modules of the electronic system. The permanent storage device 3035, on the other hand, is a read-and-write memory device. This device is a non-volatile memory unit that stores instructions and data even when the electronic system 3000 is off. Some embodiments of the invention use a mass-storage device (such as a magnetic or optical disk and its corresponding disk drive) as the permanent storage device 3035.

Other embodiments use a removable storage device (such as a floppy disk, flash drive, etc.) as the permanent storage device. Like the permanent storage device 3035, the system memory 3025 is a read-and-write memory device. However, unlike storage device 3035, the system memory is a volatile read-and-write memory, such a random access memory. The system memory stores some of the instructions and data that the processor needs at runtime. In some embodiments, the invention's processes are stored in the system memory 3025, the permanent storage device 3035, and/or the read-only memory 3030. From these various memory units, the processing unit(s) 3010 retrieves instructions to execute and data to process in order to execute the processes of some embodiments.

The bus 3005 also connects to the input and output devices 3040 and 3045. The input devices enable the user to communicate information and select commands to the electronic system. The input devices 3040 include alphanumeric keyboards and pointing devices (also called "cursor control devices"). The output devices 3045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 30, bus 3005 also couples electronic system 3000 to a network 3065 through a network adapter (not shown). In this manner, the computer can be a part of a network of computers (such as a local area network ("LAN"), a wide area network ("WAN"), or an Intranet, or a network of networks, such as the Internet. Any or all components of electronic system 3000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 7, 9, 15, 16, 17a-b) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for performing a service statefully at a cluster of nodes including first and second nodes, the method comprising:
at the first node:
receiving a first packet for a first flow, based on a first set of flow identifiers of the first flow;
performing the service on the first packet and storing state information;
from the second node, receiving a second packet for a second flow that is part of one connection session with the first flow, wherein the second node initially received the second packet based on a second set of flow identifiers of the second flow and then forwarded the second packet to the first node as the first node previously processed the first flow that is part of the same connection session as the second flow; and
performing the service on the second packet by using state information stored at the first node for the connection session.

2. The method of claim 1, wherein the service performed for the first flow is network address translation (NAT).

3. The method of claim 2, wherein the NAT processing translates the first set of flow identifiers of the first flow into the second set of flow identifiers of the second flow.

4. The method of claim 1, wherein the first node is identified by a hash of the first set of flow identifiers while the second node is identified by a hash of the second set of flow identifiers.

5. The method of claim 1, wherein the second node comprises an indirection table having an entry for forwarding packets having the second set of flow identifiers from the second node to the first node.

6. The method of claim 5 further comprising using a pinned flow table having an entry for keeping and processing packets having the second set of flow identifiers at the first node.

7. The method of claim 1, wherein a hash of flow identifiers initially identifies an owner node of the flow, wherein the first node is the owner node of the particular flow according to a hash of the first set of flow identifiers and the second node is the owner node of the particular flow according to a hash of the second set of flow identifiers.

8. A method for performing a service statefully at a cluster of nodes including a plurality of nodes, the method comprising:
at a first node:
based on an original source address in headers of a plurality of outgoing packets exiting a logical network segment, receiving the plurality of outgoing packets;
performing a service on each outgoing packet; and
for each of the outgoing packets, translating the original source address in the header of the outgoing packet to a translated source address that is uniquely associated with the first node to ensure that incoming packets that enter the logical network segment in response to the plurality of outgoing packets are received by the first node based on the translated source address, instead of being received by another node in the node cluster.

9. The method of claim 8 further comprising performing inverse source network address translation (SNAT) on each incoming packet to replace the translated source address with the original source address of the flow.

10. The method of claim 8 further comprising maintaining state information for the incoming packets.

11. A non-transitory machine readable medium storing a program for performing a service statefully at a cluster of nodes including a plurality of nodes, the program for execution on at least one processing unit of a first node, the program comprising sets of instructions for:

based on an original source address in headers of a plurality of outgoing packets exiting a logical network segment, receiving the plurality of outgoing packets;

performing a service on each outgoing packet; and for each of the outgoing packets, translating the original source address in the header of the outgoing packet to a translated source address that is uniquely associated with the first node to ensure that incoming packets that enter the logical network segment in response to the plurality of outgoing packets are received by the first node based on the translated source address, instead of being received by another node in the node cluster.

12. The non-transitory machine readable medium of claim 11, wherein the program further comprises a set of instructions for performing inverse source network address translation (SNAT) on an incoming packet that replaces the translated source address in the header of the incoming packet with the original source address.

13. The non-transitory machine readable medium of claim 11, wherein the program further comprises a set of instructions for maintaining state information for the incoming packets.

14. A non-transitory machine readable medium storing a program for execution on at least one processing unit, the program for performing a service statefully at a cluster of nodes including first and second nodes, the program comprising sets of instructions for:

at the first node:

receiving a first packet for a first flow, based on a first set of flow identifiers of the first flow;

performing the service on the first packet and storing state information;

from the second node, receiving a second packet for a second flow that is part of one connection session with the first flow, wherein the second node initially received the second packet based on a second set of flow identifiers of the second flow and then forwarded the second packet to the first node as the first node previously processed the first flow that is part of the same connection session as the second flow; and performing the service on the second packet by using state information of the particular flow stored at the first node for the connection session.

15. The non-transitory machine readable medium of claim 14, wherein the service performed for the first flow is network address translation (NAT).

16. The non-transitory machine readable medium of claim 15, wherein the NAT processing translates the first set of flow identifiers of the first flow into the second set of flow identifiers of the second flow.

17. The non-transitory machine readable medium of claim 14, wherein the first node is identified by a hash of the first set of flow identifiers while the second node is identified by a hash of the second set of flow identifiers.

18. The non-transitory machine readable medium of claim 14, wherein the second node comprises an indirection table having an entry for forwarding packets having the second set of flow identifiers from the second node to the first node.

19. The non-transitory machine readable medium of claim 18 further comprising a set of instructions for using a pinned flow table having an entry for keeping and processing packets having the second set of flow identifiers at the first node.

20. The non-transitory machine readable medium of claim 14, wherein a hash of flow identifiers initially identifies an owner node of the flow, wherein the first node is the owner node of the particular flow according to a hash of the first set of flow identifiers and the second node is the owner node of the particular flow according to a hash of the second set of flow identifiers.

* * * * *